(12) United States Patent
Liu et al.

(10) Patent No.: US 11,452,068 B2
(45) Date of Patent: Sep. 20, 2022

(54) TERMINAL DEVICE GROUPING METHOD, RELATED APPARATUS, AND SYSTEM

(71) Applicant: HUAWEI TECHNOLOGIES CO., LTD., Guangdong (CN)

(72) Inventors: Jun Liu, Beijing (CN); Junren Chang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/176,830

(22) Filed: Feb. 16, 2021

(65) Prior Publication Data
US 2021/0176729 A1 Jun. 10, 2021

Related U.S. Application Data

(63) Continuation of application No. PCT/CN2019/100459, filed on Aug. 13, 2019.

(30) Foreign Application Priority Data

Aug. 17, 2018 (CN) .......................... 201810947642.0

(51) Int. Cl.
*H04W 68/02* (2009.01)
*H04W 68/00* (2009.01)
(Continued)

(52) U.S. Cl.
CPC ..... *H04W 68/005* (2013.01); *H04W 52/0235* (2013.01); *H04W 76/28* (2018.02)

(58) Field of Classification Search
CPC ........... H04W 68/005; H04W 52/0235; H04W 76/28; H04W 68/02; Y02D 30/70
(Continued)

(56) References Cited

U.S. PATENT DOCUMENTS

2002/0104083 A1\* 8/2002 Hendricks .......... H04N 21/2381
725/34
2007/0156661 A1\* 7/2007 Allen .................... G06F 16/903
(Continued)

FOREIGN PATENT DOCUMENTS

CN 102143600 A 8/2011
CN 108271215 A 7/2018
(Continued)

OTHER PUBLICATIONS

R1-1801430, Huawei et al, On "wake-up signal" for eFeMTC, 3GPP TSG RAN WG1 Meeting #92, Athens, Greece, Feb. 26-Mar. 2, 2018, total 6 pages.
(Continued)

*Primary Examiner* — Inder P Mehra
(74) *Attorney, Agent, or Firm* — Womble Bond Dickinson (US) LLP

(57) ABSTRACT

This application discloses a terminal device grouping method. The method may include: First, a network device groups, one or more times according to a grouping rule, terminal devices associated with a first paging occasion PO. Then, the network device notifies all terminal devices associated with the first PO of the grouping rule and power saving signal receiving location information of each group of terminal devices. Next, the terminal device determines, according to the grouping rule, a group number of a group to which the terminal device belongs, and determines, based on the group number, a power saving signal receiving location corresponding to the group number.

23 Claims, 8 Drawing Sheets

(51) Int. Cl.
*H04W 76/28* (2018.01)
*H04W 52/02* (2009.01)

(58) Field of Classification Search
USPC .......................................................... 370/329
See application file for complete search history.

(56) References Cited

U.S. PATENT DOCUMENTS

| 2013/0015953 | A1* | 1/2013 | Hsu | H04W 4/08 |
| | | | | 340/7.46 |
| 2017/0013553 | A1 | 1/2017 | Huang et al. | |
| 2021/0168759 | A1* | 6/2021 | Pan | H04W 72/042 |

FOREIGN PATENT DOCUMENTS

| EP | 2424290 A1 | 2/2012 |
| EP | 3094154 A1 | 11/2016 |
| WO | 2017166313 A1 | 10/2017 |

OTHER PUBLICATIONS

3GPP TS 36.304 V15.0.0 (Jun. 2018), 3rd Generation Partnership Project;Technical Specification Group Radio Access Network;Evolved Universal Terrestrial Radio Access (E-UTRA); User Equipment (UE) procedures in idle mode (Release 15), total 52 pages.
R1-1801483, Ericsson, Downlink channel power efficiency for MTC, 3GPP TSG-RAN WG1 Meeting #92, Athens, Greece, Feb. 26-Mar. 2, 2018, total 11 pages.
3GPP TS 38.304 V15.0 0 (Jun. 2018), 3rd Generation Partnership Project;Technical Specification Group Radio Access Network;NR;User Equipment (UE) procedures in Idle mode and RRC Inactive state(Release 15), total 25 pages.
R1-1801306(R2-1714008), RAN2, Reply LS to RAN1 on wake-up signal, 3GPP TSG RAN WG1 Meeting #92, Athens, Greece, Feb. 26-Mar. 2, 2018, total 1 pages.
R1-1803885, Huawei et al, On "wake-up signal" for eFeMTC, 3GPP TSG RAN WG1 Meeting #92bis, Sanya, China, Apr. 16-20, 2018, total 7 pages.
R2-1805082, Huawei et al, Wake-up signal in NB-IoT and eMTC, 3GPP TSG-RAN WG2 Meeting #101bis, Sanya, P.R. China, Apr. 16-20, 2018, total 11 pages.
RP-180229, CATT, Summary of NR UE Power Consumption Email Discussion, 3GPP TSG-RAN #79, Chennai, India, Mar. 19-22, 2018, total 4 pages.
Intel Corporation: "Configurations of wake-up signal for feNB-IoT",3GPP Draft; R1-1717344, 3rd Generation Partnership Project (3GPP), vol. RAN WG1, No. Prague, Czech Republic; Oct. 9, 2017-Oct. 13, 2017 , XP051351859, 4 pages.
Qualcomm Incorporated: "Further discussion on WUS configurations and procedures", 3GPP Draft; R1-1802332_WUS Config, 3rd Generation Partnership Project (3GPP), vol. RAN WG1, No. Athens, Greece; Feb. 26, 2018-Mar. 2, 2018 ,XP051397860, 6 pages.
Huawei et al: "On wake-up signal for eFeMTC", 3GPP Draft; R1-1805979, 3rd Generation Partnership Project (3GPP), vol. RAN WG1, No. Busan, Korea; May 21, 2018-May 25, 2018 , XP051441198, 5 pages.
Qualcomm Incorporated: "Discussion on UE-group wake-up signalfor MTC", 3GPP Draft; R1-1809022_MWUS UE Grouping, 3rd Generation Partnership Project (3GPP), vol. RAN WG1, No. Gothenburg, Sweden; Aug. 20, 2018-Aug. 24, 2018, XP051516394, 5 pages.

* cited by examiner

TERMINAL DEVICE GROUPING METHOD, RELATED APPARATUS, AND SYSTEM

CROSS-REFERENCE TO RELATED APPLICATIONS

This application is a continuation of International Application No. PCT/CN2019/100459, filed on Aug. 13, 2019, which claims priority to Chinese Patent Application No. 201810947642.0, filed on Aug. 17, 2018. The disclosures of the aforementioned applications are hereby incorporated by reference in their entireties.

TECHNICAL FIELD

This application relates to the field of wireless communications technologies, and in particular, to a terminal device grouping method, a related apparatus, and a system.

BACKGROUND

In a future communications system such as a new radio (NR) communications system, a proportion of a high-speed data transmission service will increase, and a peak rate will also increase. The NR system can support high-rate data transmission. Therefore, it is considered that user data may be generated in bursts and transmission of the user data is completed within a short period of time. A terminal device reduces power consumption of the terminal device by using a power consumption reducing technology, to improve an endurance capability of the terminal device. Specifically, the terminal device configures a discontinuous reception (DRX) mechanism for a terminal device in a connected mode, a terminal device in an idle mode, and a terminal device in an inactive mode by using a network device. Unnecessary power consumption of PDCCH monitoring can be avoided if a power saving signal is effectively decoded or detected before a physical downlink control channel (PDCCH)/physical downlink shared channel (PDSCH) is decoded, and the power saving signal may include a wake-up signal (WUS) and/or a go-to-sleep signal (GTS).

Taking the WUS as an example, a basic manner is to use one set of WUSs for all terminal devices associated with a same paging occasion (PO). When any terminal device is paged in a PO, the network device sends the WUS, and all terminal devices associated with the PO need to monitor the PO. Therefore, when one terminal device is paged, the network device also needs to send the WUS, and all the terminal devices associated with the PO wake up to monitor the PO. In this way, the terminal device still has unnecessary power consumption.

SUMMARY

This application provides a terminal device grouping method, a related apparatus, and a system, to reduce power consumption of a terminal device.

According to a first aspect, this application provides a terminal device grouping method. The method may include: First, a network device groups, one or more times according to a grouping rule, terminal devices associated with a first paging occasion PO. Then, the network device notifies all terminal devices associated with the first PO of the grouping rule and power saving signal receiving location information of each group of terminal devices, where a power saving signal includes a wake-up signal WUS or a go-to-sleep signal GTS.

In this application, the terminal devices associated with the first PO are grouped one or more times according to the grouping rule, and the power saving signal receiving location information is configured for each group of terminal devices, so that before the first PO, one or more groups of terminal devices that have been paged can be woken up by using a power saving signal, and one or more groups of terminal devices that have not been paged can be enabled to sleep, thereby reducing total power consumption of the terminal devices associated with the first PO.

In an embodiment, that a network device groups, a plurality of times according to a grouping rule, terminal devices associated with a first paging occasion PO includes: The network device groups, for the first time according to the grouping rule, the terminal devices associated with the first paging occasion PO, to obtain M groups of terminal devices, and then groups each of the M groups of terminal devices for the second time according to the grouping rule, to obtain T groups of terminal devices, where M is greater than or equal to 1, T is greater than or equal to 2, and a mapping relationship included in the grouping rule used for the first time of grouping is different from a mapping relationship included in the grouping rule used for the second time of grouping. A plurality of times of grouping are performed by using different mapping relationships, so that a requirement for a larger quantity of groups can be met.

In an embodiment, the grouping rule includes: a mapping relationship between a group number and a discontinuous reception DRX cycle; or a mapping relationship between a group number and one or more of the following parameters: a terminal device identifier, a quantity of groups, a quantity of paging frames PFs in each discontinuous reception DRX cycle, a quantity of POs in each PF, and a weight of each group of terminal devices; or a mapping relationship between a group number and a paging frequency range; or a mapping relationship between a group number and a terminal device category set; or a mapping relationship between a group number and a channel condition range.

In an embodiment, when the grouping rule includes the mapping relationship between a group number and a discontinuous reception DRX cycle, each group of terminal devices obtained through one or more times of grouping corresponds to a DRX cycle value or a DRX cycle value set.

Because a DRX cycle may reflect a service density of a terminal device to some extent, for terminal devices associated with a same PO, terminal devices whose DRX cycles are the same or similar may be grouped into a same group, so that a probability that each group of terminal devices are simultaneously paged is increased, or in other words, a false alarm probability is reduced, thereby reducing total power consumption of the terminal devices associated with the same PO.

In an embodiment, when the grouping rule includes the mapping relationship between a group number and one or more of the following parameters: a terminal device identifier, a quantity of groups, a quantity of paging frames PFs in each DRX cycle, a quantity of POs in each PF, and a weight of each group of terminal devices, the group number is a minimum index value n that meets the following formula:

$$\text{floor}(UE\_ID/(N*Ns)) \bmod g < g(0)+g(1)+ \ldots +g(n)$$

UE_ID is the terminal device identifier, $g(n)$ is a weight of a user group whose group number is n, $g(n)$ is an integer, and $g(0)+g(1)+ \ldots +g(G-1)=g$, where G is the quantity of groups, a value range of the minimum index n is $0 \leq n \leq G-1$, N is the quantity of paging frames PFs in each DRX cycle, and Ns is the quantity of POs in each PF.

A corresponding weight value is set for each group of terminal devices, and terminal devices associated with a same PO may be grouped one or more times by using the foregoing formula. Because the weight value of each group of terminal devices may be used to represent a quantity of devices accommodated in each group, a false alarm rate of each group of terminal devices may be adjusted by adjusting the weight value. Therefore, when paging arrives, only a terminal device group that has been paged can be woken up, and a terminal device group that has not been paged can be enabled to sleep, thereby reducing total power consumption of the terminal devices and providing a condition for adjusting the false alarm rate of each group of terminal devices.

In an embodiment, when the grouping rule includes the mapping relationship between a group number and a paging frequency range, the method further includes: The network device obtains a quantity of groups for each time of grouping, and delimits a plurality of paging frequency ranges based on the quantity of groups; or the network device delimits a paging frequency range, where a quantity of groups for each time of grouping is the same as a quantity of paging frequency ranges.

In an embodiment, a paging frequency is an average quantity of times that a terminal device is paged in a unit time in a statistics time period determined according to a paging frequency statistics rule; and the method further includes: The network device notifies all the terminal devices associated with the first PO of the paging frequency statistics rule, where the paging frequency statistics rule is used to determine a paging frequency statistics time period.

Because a probability that terminal devices whose paging frequencies are the same or similar are simultaneously paged is relatively high, terminal devices whose paging frequencies are the same or similar and that are associated with a same PO are grouped into one group, so that a false alarm rate of a terminal device can be reduced, thereby reducing power consumption of the terminal device.

In an embodiment, when the grouping rule includes the mapping relationship between a group number and one or more of the following parameters: a terminal device identifier, a quantity of groups, a quantity of paging frames PFs in each discontinuous reception DRX cycle, a quantity of POs in each PF, and a weight of each group of terminal devices, the method further includes: The network device adjusts a false alarm rate of each group of terminal devices by adjusting the weight of each group of terminal devices, where a false alarm rate of one group of terminals is a ratio of a quantity of times that any terminal device in the group of terminal devices is woken up but is not paged to a quantity of times that any terminal device in the group of terminal devices is woken up in a first time period.

The false alarm rate of each group of terminal devices is adjusted by adjusting the weight, thereby further reducing total power consumption of one or more groups of terminal devices. For example, if a false alarm probability of a group 0 is too high, a weight value of the group 0 may be reduced through adjustment, so that some terminal devices originally grouped into the group 0 are grouped into another group, thereby reducing the false alarm rate of the group 0, that is, reducing total power consumption of terminal devices in the group 0.

In an embodiment, when the grouping rule includes the mapping relationship between a group number and a terminal device category set, the method further includes: The network device obtains a quantity of groups for each time of grouping, and delimits a plurality of terminal device category sets based on the quantity of groups; or the network device delimits a terminal device category set, where a quantity of groups for each time of grouping is the same as a quantity of delimited terminal device category sets.

In an embodiment, when the grouping rule includes the mapping relationship between a group number and a terminal device category set, the method further includes: The network device determines a terminal device category of each group of terminal devices by using a terminal device feature of each group of terminal devices, where the terminal device feature includes at least one of the following: a peak rate, a buffer size, and mobility.

Because a probability that paging frequencies of terminal devices of a same category are similar is relatively high, and a probability that the terminal devices of the same category are simultaneously paged is also relatively high, terminal devices of a same category that are associated with a same PO are grouped into one group, so that a false alarm rate of a terminal device can be reduced, thereby reducing power consumption of the terminal device.

In an embodiment, when the grouping rule includes the mapping relationship between a group number and a channel condition range, the method further includes: The network device obtains a quantity of groups for each time of grouping, and delimits a plurality of channel condition ranges based on the quantity of groups; or the network device delimits a channel condition range, where a quantity of groups for each time of grouping is the same as a quantity of channel condition ranges.

In an embodiment, that the network device notifies all terminal devices associated with the first PO of the grouping rule and power saving signal receiving location information of each group of terminal devices includes: The network device notifies, by using system information, all the terminal devices associated with the first PO of the grouping rule and the power saving signal receiving location information of each group of terminal devices.

Because average power signal transmission duration required by terminal devices whose channel conditions are the same or similar to successfully decode a power saving signal is relatively close, terminal devices whose channel conditions are the same are grouped into one group, so that overheads of network signaling can be reduced, a gap difference between a moment at which each group of terminal devices receive a power saving signal and a corresponding PDCCH monitoring moment is reduced, and impact on network scheduling efficiency is reduced.

According to a second aspect, this application provides a terminal device grouping method. The method may include: First, a first terminal device receives a grouping rule used to group, one or more times, terminal devices associated with a first paging occasion PO and power saving signal receiving location information of each group of terminal devices that are notified by a network device, where a power saving signal includes a wake-up signal WUS or a go-to-sleep signal GTS. Then, the first terminal device determines, according to the grouping rule, a group number of a group to which the first terminal device belongs. Then, the first terminal device determines, based on a correspondence between the group number and the power saving signal receiving location information of each group of terminal devices, a power saving signal receiving location corresponding to the first terminal device.

For beneficial effects of this aspect, refer to the first aspect. Details are not described herein again.

In an embodiment, when the first terminal device receives the grouping rule used to perform a plurality of times of grouping and the power saving signal receiving location information of each group of terminal devices that are notified by the network device, mapping relationships included in the grouping rule used for each time of grouping are different.

In an embodiment, the grouping rule includes: a mapping relationship between a group number and a discontinuous reception DRX cycle; or a mapping relationship between a group number and one or more of the following parameters: a terminal device identifier, a quantity of groups, a quantity of paging frames PFs in each DRX cycle, a quantity of POs in each PF, and a weight of each group of terminal devices; or a mapping relationship between a group number and a paging frequency range; or a mapping relationship between a group number and a terminal device category set; or a mapping relationship between a group number and a channel condition range.

In an embodiment, when the grouping rule includes the mapping relationship between a group number and a discontinuous reception DRX cycle, each group of terminal devices corresponds to a DRX cycle value or a DRX cycle value set; and that the first terminal device determines, according to the grouping rule, a group number of a group to which the first terminal device belongs includes: The first terminal device determines the group number of the first terminal device based on a DRX cycle of the first terminal device and the mapping relationship between a group number and a DRX cycle.

In an embodiment, when the grouping rule includes the mapping relationship between a group number and one or more of the following parameters: a terminal device identifier, a quantity of groups, a quantity of paging frames PFs in each DRX cycle, a quantity of POs in each PF, and a weight of each group of terminal devices, the group number is a minimum index value n that meets the following formula:

$$\mathrm{floor}(\mathrm{UE\_ID}/(N^{*}Ns))\bmod g < g(0) + g(1) + \ldots + g(n)$$

UE_ID is the terminal device identifier, $g(n)$ is a weight of a user group whose group number is n, $g(n)$ is an integer, and $g(0)+g(1)+ \ldots +g(G-1)=g$, where G is a quantity of groups of at least one terminal device group, a value range of the minimum index n is $0 \leq n \leq G-1$, N is the quantity of paging frames PFs in each DRX cycle, and Ns is the quantity of POs in each PF.

In an embodiment, when the grouping rule includes the mapping relationship between a group number and a paging frequency range, a quantity of groups for each time of grouping is the same as a quantity of paging frequency ranges; and that the first terminal device determines, according to the grouping rule, a group number of a group to which the first terminal device belongs includes: The first terminal device determines the group number of the first terminal device based on a paging frequency of the first terminal device and the mapping relationship between a group number and a paging frequency range.

In an embodiment, a paging frequency is an average quantity of times that a terminal device is paged in a unit time in a statistics time period determined according to a paging frequency statistics rule; and the method further includes: The first terminal device receives the paging frequency statistics rule notified by the network device, where the paging frequency statistics rule is used to determine a paging frequency statistics time period.

In an embodiment, when the grouping rule includes the mapping relationship between a group number and a terminal device category set, a quantity of groups for each time of grouping is the same as a quantity of terminal device category sets; and that the first terminal device determines, according to the grouping rule, a group number of a group to which the first terminal device belongs includes: The first terminal device determines the group number of the first terminal device based on a terminal device category of the first terminal device and the mapping relationship between a group number and a terminal device category set.

In an embodiment, the first terminal device determines the terminal device category of the first terminal device by using a terminal device feature of the first terminal device, where the terminal device feature includes at least one of the following: a peak rate, a buffer size, and mobility.

In an embodiment, when the grouping rule includes the mapping relationship between a group number and a channel condition range, a quantity of groups for each time of grouping is the same as a quantity of channel condition ranges; and that the first terminal device determines, according to the grouping rule, a group number of a group to which the first terminal device belongs includes: The first terminal device determines the group number of the first terminal device based on a channel condition of the first terminal device and the mapping relationship between a group number and a channel condition range.

In an embodiment, that a first terminal device receives a grouping rule used to group, one or more times, terminal devices associated with a first paging occasion PO and power saving signal receiving location information of each group of terminal devices that are notified by a network device includes: The first terminal device receives, by using system information, the grouping rule used to group, one or more times, the terminal devices associated with the first paging occasion PO and the power saving signal receiving location information of each group of terminal devices that are notified by the network device. According to a third aspect, this application provides a terminal device grouping apparatus. The apparatus has a function of implementing behavior of the network device in the foregoing method design. The function may be implemented by hardware, or may be implemented by hardware executing corresponding software. The hardware or the software includes one or more modules corresponding to the foregoing function. The module may be software and/or hardware.

In an embodiment, a structure of the apparatus includes a processor and a transmitter. The processor is configured to group, one or more times according to a grouping rule, terminal devices associated with a first paging occasion PO. The transmitter is configured to notify all terminal devices associated with the first PO of the grouping rule and power saving signal receiving location information of each group of terminal devices obtained through one or more times of grouping by the processing module. The network device may further include a memory. The memory is coupled to the processor and is configured to store a program instruction and data that are necessary for the network device.

According to a fourth aspect, an embodiment of the present disclosure provides a terminal device grouping apparatus. The apparatus has a function of implementing behavior of the terminal device in the foregoing method design. The function may be implemented by hardware, or may be implemented by hardware executing corresponding software. The hardware or the software includes one or more modules corresponding to the foregoing function.

In an embodiment, a structure of the apparatus includes a receiver and a processor. The receiver is configured to receive a grouping rule used to group, one or more times, terminal devices associated with a first paging occasion PO and power saving signal receiving location information of each group of terminal devices that are notified by a network device. The processor is configured to: determine, according to the grouping rule received by the receiving module, a group number of a group to which a first terminal device belongs, and determine, based on a correspondence between the group number and the power saving signal receiving location information of each group of terminal devices, a power saving signal receiving location corresponding to the group number of the apparatus. The terminal device may further include a memory. The memory is coupled to the processor and is configured to store a program instruction and data that are necessary for the terminal device.

According to a fifth aspect, this application provides a network device, configured to perform the terminal device grouping method described in the first aspect. The network device may include a memory, a processor coupled to the memory, and a transceiver. The transceiver is configured to communicate with another communications device (for example, a terminal). The memory is configured to store code for implementing the terminal device grouping method described in the first aspect, and the processor is configured to execute program code stored in the memory, that is, perform the method provided in any one of the first aspect and the embodiments of the first aspect.

According to a sixth aspect, this application provides a terminal, configured to perform the terminal device grouping method described in the first aspect. The terminal device may include a memory, a processor coupled to the memory, and a transceiver. The transceiver is configured to communicate with another communications device (for example, a terminal). The memory is configured to store code for implementing the terminal device grouping method described in the first aspect, and the processor is configured to execute program code stored in the memory, that is, perform the method provided in any one of the second aspect and the embodiments of the second aspect.

According to a seventh aspect, a computer readable storage medium is provided. The readable storage medium stores program code for implementing the terminal device grouping method provided in any one of the first aspect and the embodiments of the first aspect, and the program code includes an execution instruction for running the terminal device grouping method provided in any one of the first aspect and the embodiments of the first aspect.

According to an eighth aspect, a computer readable storage medium is provided. The readable storage medium stores program code for implementing the terminal device grouping method provided in any one of the second aspect and the embodiments of the second aspect, and the program code includes an execution instruction for running the terminal device grouping method provided in any one of the second aspect and the embodiments of the second aspect.

BRIEF DESCRIPTION OF DRAWINGS

To describe the technical solutions in the embodiments of this application or in the background more clearly, the following briefly describes the accompanying drawings for describing the embodiments of this application or the background.

DESCRIPTION OF EMBODIMENTS

Terms used in some embodiments of this application are merely used to explain specific embodiments of this application, but are not intended to limit this application.

Figure 1:
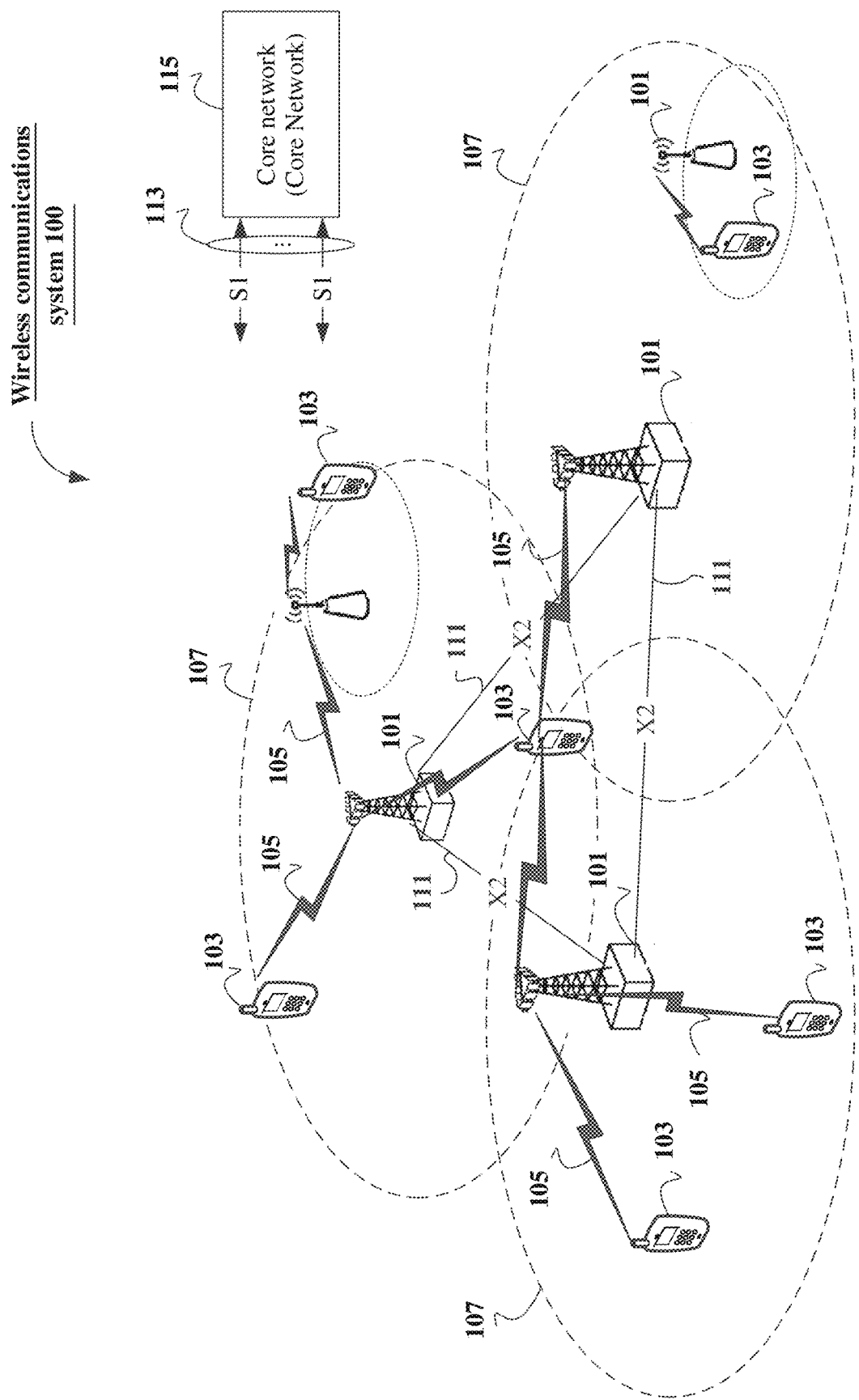
FIG. 1 is a schematic architectural diagram of a wireless communications system according to this application.

FIG. 1 shows a wireless communications system according to this application. The wireless communications system may operate on a high frequency band, and is not limited to a long term evolution (LTE) system, and may be a future evolved 5th generation (5G) mobile communications system, a new radio (NR) system, a machine-to-machine (M2M) system, or the like. As shown in FIG. 1, the system architecture may support access to a core network (CN) by a radio access technology (for example, an evolved universal terrestrial radio access network (E-UTRAN), a 5G RAN, or a next generation RAN (NG RAN)) defined by a 3GPP standard group. As shown in FIG. 1, a wireless communications system 100 may include one or more network devices 101, one or more terminal devices 103, and a core network 115.

The network device 101 may be a base station. The base station may be configured to communicate with one or more terminals, or may be configured to communicate with one or more base stations that have some terminal functions (for example, communication between a macro base station and a micro base station, such as an access point). The base station may be an evolved NodeB (eNB) in the LTE system, and a base station in the 5G system or the new radio (NR) system. In addition, the base station may be alternatively an access point (AP), a transmission node (transmission point, TRP), a central unit (CU), or another network entity, and may include some or all of functions of the foregoing network entity.

The terminal device 103 may be distributed in the entire wireless communications system 100, and may be still or mobile. In some embodiments of this application, the terminal 103 may be a handheld terminal, a subscriber unit, a cellular phone, a smartphone, a machine type communication (MTC) terminal device, a wireless data card, a personal digital assistant (PDA) computer, a tablet computer, a wireless modem, a handheld device, a laptop computer, a cordless phone, a wireless local loop (WLL) station, other devices that can access a network, or the like.

The core network device 115 may include an MME, an S-GW, and the like in the E-UTRAN, and may further include a UPF, an AMF, and the like in the NG RAN.

Specifically, the network device 101 may be configured to communicate with the terminal device 103 through a wireless interface 105 under the control of a network device controller (not shown). In some embodiments, the network device controller may be a part of the core network 115, or may be integrated into the network device 101. Specifically, the network device 101 may be configured to transmit control information or user data to the core network 115 through a backhaul interface 113 (for example, an S1 interface or an NG interface). Specifically, the network devices 101 may directly or indirectly communicate with each other through a backhaul interface 111 (for example, an X2 interface or an Xn interface).

Figure 2:
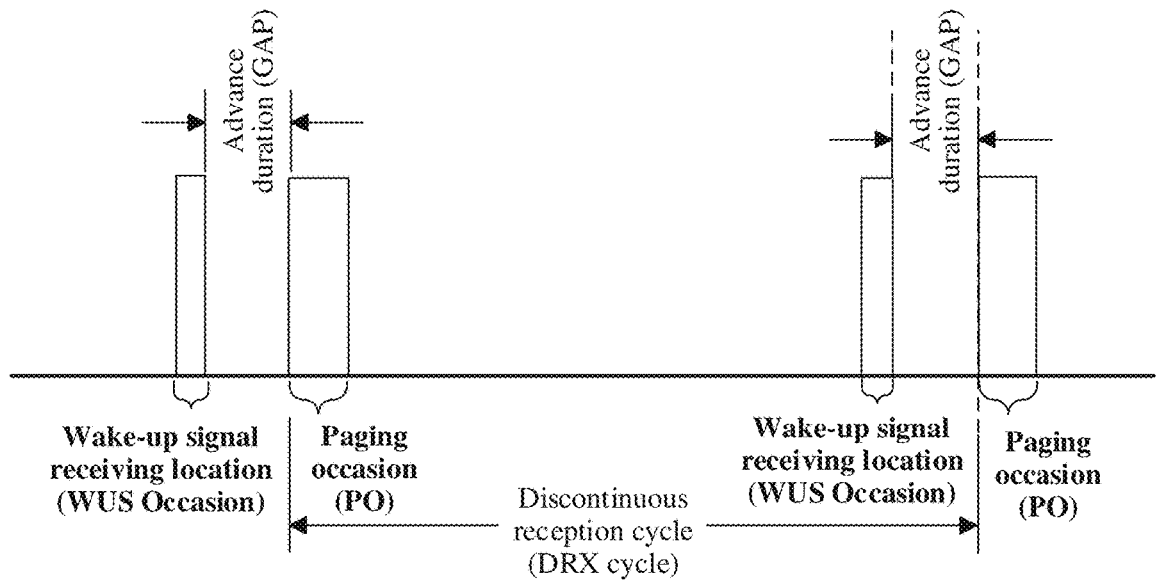
FIG. 2 is a schematic application diagram of a wake-up signal WUS according to this application.

FIG. 2 is a schematic application diagram of a WUS. In FIG. 2, a network device may notify a terminal device in advance of a WUS receiving location (WUS occasion) of the terminal device, for example, paging occasion (PO) advance duration (GAP) corresponding to the terminal device. It is assumed that when the network device determines that the terminal device is paged in the first DRX cycle in FIG. 2, the network device sends a WUS to the terminal device before a PO of the first DRX cycle of the terminal device, to wake up the terminal device, so that the terminal device is enabled to normally monitor a PDCCH in a corresponding PO. It is assumed that when determining that the terminal device is not paged in the second DRX cycle in FIG. 2, the network device does not send a WUS to the terminal device before a PO of the second DRX cycle, so that the terminal device is enabled to not monitor a PDCCH in a corresponding PO, thereby reducing unnecessary power consumption.

Figure 3:
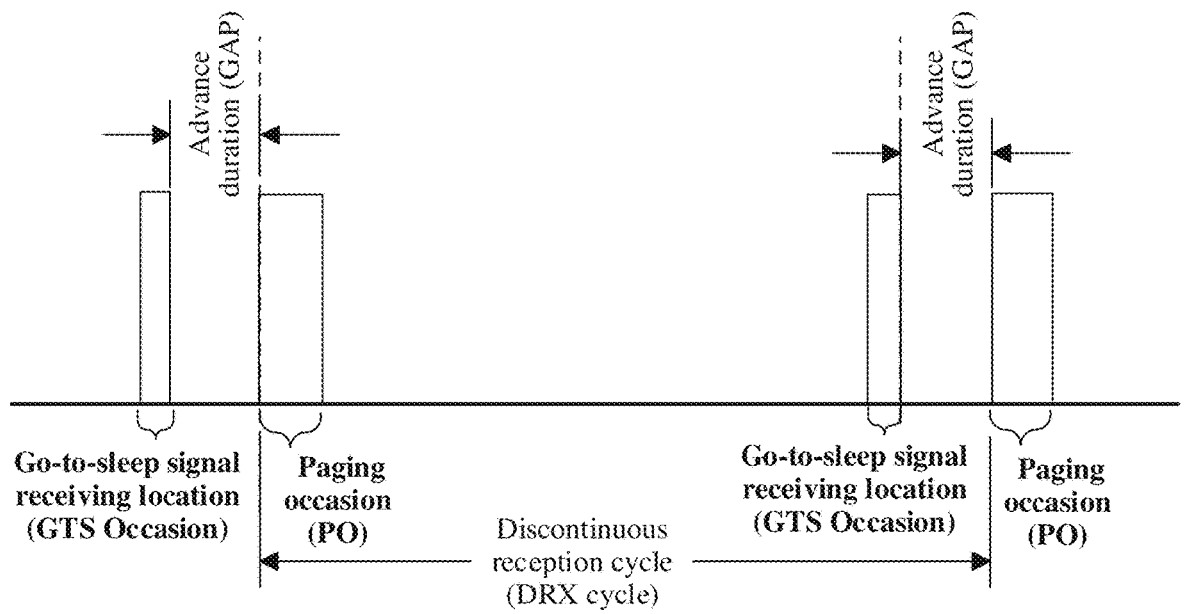
FIG. 3 is a schematic application diagram of a go-to-sleep signal GTS according to this application.

FIG. 3 is a schematic application diagram of a GTS. In FIG. 3, a network device may notify a terminal device in advance of a GTS receiving location (GTS occasion) of the terminal device, for example, PO advance duration GAP corresponding to the terminal device. It is assumed that when the network device determines that the terminal device is not paged in the first DRX cycle in FIG. 3, the network device sends a GTS to the terminal device before a PO of the first DRX cycle of the terminal device, so that the terminal device is enabled not to monitor a PDCCH in a corresponding PO, thereby reducing unnecessary power consumption. It is assumed that when determining that the terminal device is paged in the second DRX cycle in FIG. 3, the network device does not send a GTS to the terminal device before a PO of the DRX cycle, so that the terminal device is enabled to normally monitor a PDCCH in a corresponding PO.

Therefore, in comparison with an original paging process in which the terminal device needs to monitor a PDCCH in a PO, the foregoing introduction of the WUS/GTS provides a power consumption reducing method for the terminal device to adaptively monitor the PDCCH based on a service arrival status.

If a WUS is used, a basic manner is to use one set of WUSs for all terminal devices associated with a same PO. When any terminal device is paged in a PO, the network device sends the WUS, and all terminal devices associated with the PO need to monitor the PO. Therefore, when one terminal device is paged, the network device also needs to send the WUS, and all the terminal devices associated with the PO wake up to monitor the PO. In this way, the terminal device has unnecessary power consumption.

For the foregoing problem, a main inventive principle of this application may include: Terminal devices associated with a same PO may be grouped, and a WUS/GTS receiving location is used for each group of terminal devices, to control whether the group of terminal devices wake up in the PO to monitor a PDCCH. A quantity of terminal devices that use one set of WUS/GTSs after the grouping is reduced. Therefore, a probability that a terminal device is woken up but is not actually paged is reduced, or in other words, a paging false alarm rate is reduced, thereby reducing power consumption of the terminal device.

Figure 4:
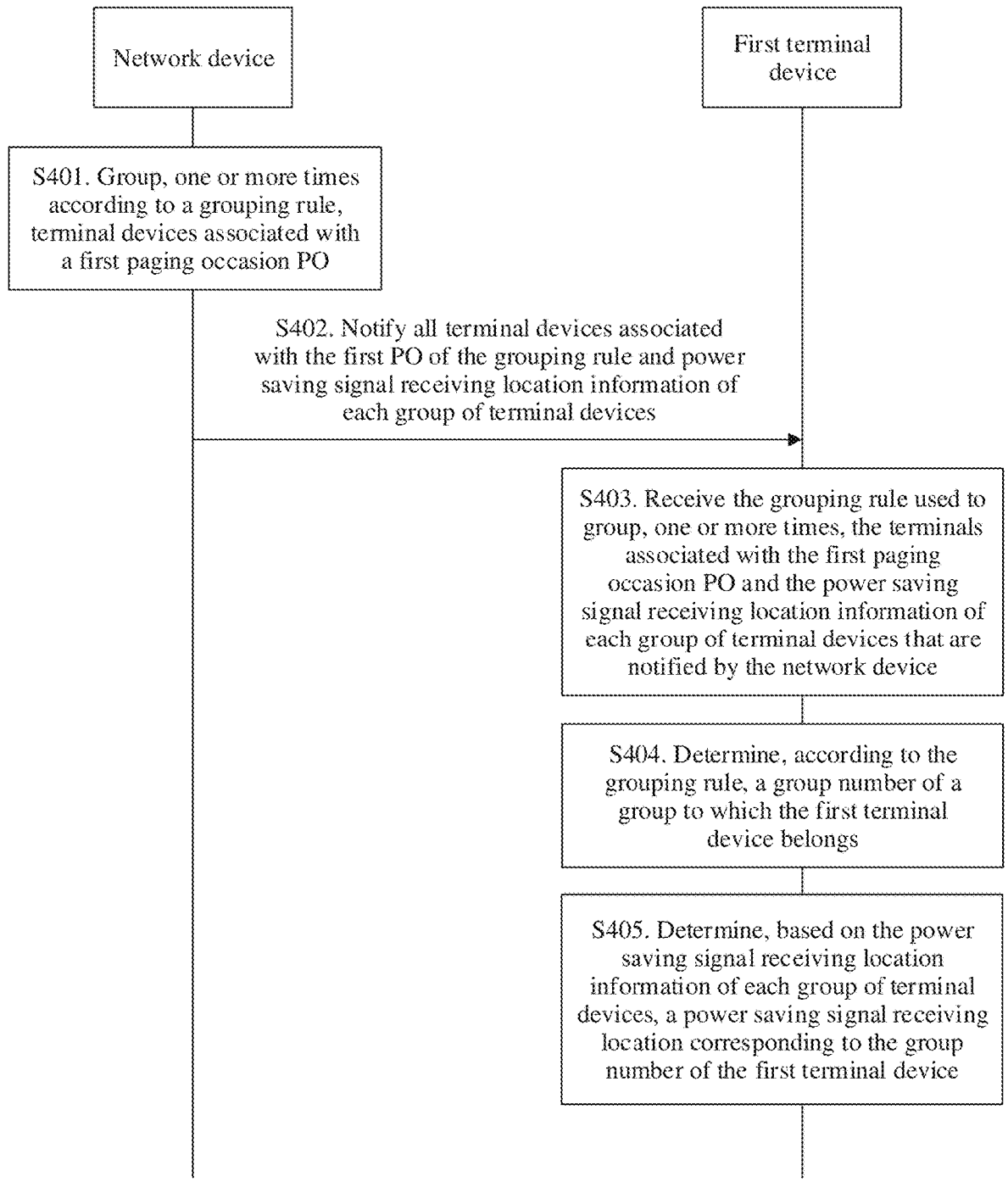
FIG. 4 is a schematic diagram of a terminal device grouping method according to this application.

Based on the foregoing main inventive principle, the following describes an overall procedure of a terminal device grouping method provided in this application. FIG. 4 is a schematic flowchart of a terminal device grouping and wake-up method according to this application. As shown in FIG. 4, the terminal device grouping and wake-up method provided in this application may include operations S401 to S405. A first terminal device may be any terminal device associated with a first paging PO.

S401. A network device groups, one or more times according to a grouping rule, terminal devices associated with a first paging occasion PO.

When the network device groups, once according to the grouping rule, the terminal devices associated with the first paging occasion PO, the grouping rule may be any one of the following grouping rules:

Rule 1: The grouping rule is a mapping relationship between a group number and a discontinuous reception DRX cycle.

Rule 2: The grouping rule may be alternatively a mapping relationship between a group number and one or more of the following parameters: a terminal device identifier, a quantity of groups, a quantity of paging frames PFs in each DRX cycle, a quantity of POs in each PF, and a weight of each group of terminal devices.

Rule 3: The grouping rule may be alternatively a mapping relationship between a group number and a paging frequency range.

Rule 4: The grouping rule may be alternatively a mapping relationship between a group number and a terminal device category set.

Rule 5: The grouping rule may be alternatively a mapping relationship between a group number and a channel condition range.

When the network device groups, a plurality of times according to the grouping rule, the terminal devices associated with the first paging occasion PO, the network device may first group, for the first time according to the grouping rule, the terminal devices associated with the first paging occasion PO, to obtain M groups of terminal devices, and then group each of the M groups of terminal devices for the second time according to the grouping rule, to obtain T groups of terminal devices, where M is greater than or equal to 1, and T is greater than or equal to 2.

It should be particularly noted that, when the grouping rule used for the first time of grouping is the rule 1, the grouping rule used for the second time of grouping is any one of the rule 2, the rule 3, the rule 4, or the rule 5; or when the grouping rule used for the first time of grouping is the rule 2, the grouping rule used for the second time of grouping is any one of the rule 1, the rule 3, the rule 4, or the rule 5; or when the grouping rule used for the first time of grouping is the rule 3, the grouping rule used for the second time of grouping is any one of the rule 1, the rule 2, the rule 4, or the rule 5; or when the grouping rule used for the first time of grouping is the rule 4, the grouping rule used for the second time of grouping is any one of the rule 1, the rule 2, the rule 3, or the rule 5; or when the grouping rule used for the first time of grouping is the rule 5, the grouping rule used for the second time of grouping is any one of the rule 1, the rule 2, the rule 3, or the rule 4.

In this application, a group number is an identifier used to distinguish each group of terminal devices. The group number may be represented by a digit. For example, group numbers of four terminal device groups are 0, 1, 2, and 3. The group number may be represented by a digit and a symbol. For example, group numbers of four terminal device groups are 0-0, 0-1, 1-0, and 1-1. The group number may be alternatively represented by a letter. For example, group numbers of four terminal device groups are A, B, C, and D. The foregoing examples are merely used to explain this application. In an embodiment, the group number may alternatively have more representation forms. This shall not be construed as a limitation herein.

For example, a mapping relationship included in the grouping rule used for the first time of grouping is different from a mapping relationship included in the grouping rule used for the second time of grouping. In other words, when a plurality of times of grouping are performed, a mapping relationship in the grouping rule used for each time of grouping varies.

For example, when the grouping rule includes the mapping relationship between a group number and a DRX cycle, each group of terminal devices obtained through one or more times of grouping corresponds to a DRX cycle value or a DRX cycle value set. The network device may group terminal devices whose DRX cycles are the same or similar into one group. For example, a DRX cycle value of a terminal device associated with the first PO may be 320 ms, 640 ms, 1280 ms, or 2560 ms. The network device may delimit two groups of terminal devices: a group 1 of terminal devices and a group 2 of terminal devices. A DRX cycle value set of the group 1 of terminal devices may be 320 ms and 640 ms, and a DRX cycle value set of the group 2 of terminal devices may be 1280 ms and 2560 ms. The network device may alternatively delimit four groups of terminal devices: a group 1 of terminal devices, a group 2 of terminal devices, a group 3 of terminal devices, and a group 4 of terminal devices. A DRX cycle value of the group 1 of terminal devices may be 320 ms, a DRX cycle value of the group 2 of terminal devices may be 640 ms, a DRX cycle value of the group 3 of terminal devices may be 1280 ms, and a DRX cycle value of the group 4 of terminal devices may be 2560 ms. The foregoing examples are merely used to explain this application and shall not be construed as a limitation.

For example, when the grouping rule includes the mapping relationship between a group number and one or more of the following parameters: a terminal device identifier, a quantity of groups, a quantity of paging frames PFs in each DRX cycle, a quantity of POs in each PF, and a weight of each group of terminal devices, the group number is a minimum index value n that meets the following formula (1):

$$\text{floor}(UE\_ID/(N*Ns)) \bmod g < g(0)+g(1)+\ldots+g(n) \quad \text{Formula (1)}$$

In the foregoing formula (1), UE_ID is the terminal device identifier, $g(n)$ is a weight of a user group whose group number is n, $g(n)$ is an integer, and $g(0)+g(1)+\ldots+g(G-1)=g$, where G is a quantity of groups for each time of grouping, a value range of the minimum index n is $0 \leq n \leq G-1$, N is the quantity of paging frames PFs in each DRX cycle, and Ns is the quantity of POs in each PF.

For example, the network device may adjust a false alarm rate of each group of terminal devices by adjusting the weight of each group of terminal devices. For example, when the network device reduces a weight $g(0)$ of a group 0 of terminal devices through adjustment, some terminal devices in the group 0 of terminal devices are transferred to another group. Therefore, a false alarm rate of the group 0 of terminal devices is reduced. The false alarm rate is a ratio of a quantity of times that any terminal device in one group of terminal devices is woken up but is not paged to a quantity of times that any terminal device in the group of terminal devices is woken up in a first time period, and the first time period may be a time period agreed by the network device and the terminal device. For example, on the first day of a specified month, if a quantity of times that any terminal device in the group 1 of terminal devices is woken up but is not paged is 120, and a quantity of times that any terminal device in the group 1 of terminal devices is woken up is 150, a false alarm rate of the group 1 of terminal devices is 80%. The foregoing example is merely used to explain this application and shall not be construed as a limitation.

For example, when the grouping rule includes the mapping relationship between a group number and a paging frequency range, each group of terminal devices may correspond to one paging frequency range. The network device may first obtain a quantity of groups for each time of grouping, and then delimit a plurality of paging frequency ranges based on the quantity of groups. In an embodiment, the network device may alternatively first delimit a plurality of paging frequency ranges, and then perform grouping, where a quantity of groups for each time of grouping is the same as a quantity of delimited paging frequency ranges. A paging frequency is a quantity of times that a terminal device is paged in a unit time in a statistics time period determined according to a paging frequency statistics rule or an average quantity of times that a terminal device is paged in a plurality of paging frequency statistics time periods. The network device may further notify all terminal devices associated with the first PO of the paging frequency statistics rule, where the paging frequency statistics rule is used to determine a paging frequency statistics time period. The paging statistics time period may be a month before the network device notifies the grouping rule, may be the first day of each month, or may be a specified hour in a day. This shall not be construed as a limitation herein.

For example, when the grouping rule includes the mapping relationship between a group number and a terminal device category set, each group of terminal devices may correspond to one terminal device set. The network device may first obtain a quantity of groups for each time of grouping, and then delimit at least one terminal device category set based on the quantity of groups. For example, if a quantity of groups obtained by the network device for one time of grouping is 3, the network device may delimit three terminal device category sets: a terminal device category set A, a terminal device category set B, and a terminal device category set C. In an embodiment, the network device may alternatively first delimit a plurality of terminal device category sets, and then perform grouping, where a quantity of groups for each time of grouping is the same as a quantity of delimited terminal device category sets. For example, the network device may delimit two terminal device category sets: a terminal device category set A and a terminal device category set B based on terminal device categories of the terminal devices associated with the first PO. In this case, the network device may group the terminal devices associated with the first PO into two groups of terminal devices: a group 1 of terminal devices and a group 2 of terminal devices. The group 1 of terminal devices may correspond to the terminal device category set A, and the group 2 of terminal devices may correspond to the terminal device category set B. The foregoing example is merely used to explain this application and shall not be construed as a limitation.

For example, when the grouping rule includes the mapping relationship between a group number and a channel condition range, each group of terminal devices may correspond to one channel condition range. The network device may first obtain a quantity of groups for each time of grouping, collect channel condition information of all terminal devices associated with the first PO, and then delimit a plurality of channel condition ranges based on the quantity of groups. For example, if a quantity of groups obtained by the network device for one time of grouping is 3, the network device may delimit three channel condition ranges: a channel condition range A, a channel condition range B, and a channel condition range C. In an embodiment, the network device may alternatively first delimit a plurality of channel condition ranges, and then perform grouping, where a quantity of groups for each time of grouping is the same as a quantity of delimited channel condition ranges. For example, the network device may delimit two channel condition ranges: a channel condition range A and a channel condition range B based on channel conditions of the terminal devices associated with the first PO. In this case, the network device may group the terminal devices associated with the first PO into two groups of terminal devices: a group 1 of terminal devices and a group 2 of terminal devices. The group 1 of terminal devices may correspond to the channel condition range A, and the group 2 of terminal devices may correspond to the channel condition range B. The foregoing example is merely used to explain this application and shall not be construed as a limitation.

S402. The network device notifies all terminal devices associated with the first PO of the grouping rule and power saving signal receiving location information of each group of terminal devices.

The network device may notify, by using system information block (SIB), all the terminal devices associated with the first PO of the grouping rule and the power saving signal receiving location information of each group of terminal devices. A power saving signal may include a wake-up signal (WUS) or a go-to-sleep signal (GTS).

For example, power saving signal receiving location information of different groups of terminal devices may be distinguished by using at least one of time domain, frequency domain, and code domain. When only time domain is used for differentiation, power saving signal receiving locations of each group of terminal devices may be distinguished by using only a timing advance relative to the first PO. For example, for the group 1 of terminal devices, the network device may send a power saving signal at a location of 50 ms ahead of the first PO, and the group 1 of terminal devices may monitor the power saving signal at the location of 50 ms ahead of the first PO. For the group 2 of terminal devices, the network device may send a power saving signal at a location of 53 ms ahead of the first PO, and the group 2 of terminal devices may monitor the power saving signal at the location of 53 ms ahead of the first PO. When only frequency domain is used for differentiation, the network device may send power saving signals for different groups of terminal devices on different frequency bands in a fixed time period ahead of the first PO. For example, for the group 1 of terminal devices, the network device may send a power saving signal on a frequency band of 2111.1 MHz to 2111.2 MHz in a time period of 50 ms to 60 ms ahead of the first PO, and the group 1 of terminal devices may receive the power saving signal on the frequency band of 2111.1 MHz to 2111.2 MHz in the time period of 50 ms to 60 ms ahead of the first PO. For the group 2 of terminal devices, the network device may send a power saving signal on a frequency band of 2111.2 MHz to 2111.3 MHz in a time period of 50 ms to 60 ms ahead of the first PO. Values of the foregoing frequency bands are merely examples for description and shall not be construed as a limitation. When only code domain is used for differentiation, sequences of power saving signals of different groups of terminal devices are different, or the network device uses different scrambling codes when sending power saving signals for different groups of terminal devices. For example, for the group 1 of terminal devices, the network device may use a scrambling code 1 when sending a power saving signal, and the group 1 of terminal devices may receive the power saving signal by using the scrambling code 1. For the group 2 of terminal devices, the network device may use a scrambling code 2 when sending a power saving signal, and the group 2 of terminal devices may receive the power saving signal by using the scrambling code 2. The foregoing examples are merely used to explain this application and shall not be construed as a limitation.

S403. A first terminal device receives the grouping rule used to group, one or more times, the terminal devices associated with the first paging occasion PO and the power saving signal receiving location information of each group of terminal devices that are notified by the network device, where a power saving signal includes a wake-up signal WUS or a go-to-sleep signal GTS.

S404. The first terminal device determines, according to the grouping rule, a group number of a group to which the first terminal device belongs.

S405. The first terminal device determines, based on a correspondence between the group number and the power saving signal receiving location information of each group of terminal devices, a power saving signal receiving location corresponding to the first terminal device.

For example, the grouping rule is the mapping relationship between a group number and a DRX cycle. The first terminal device may determine, based on a DRX cycle value of the first terminal device and the mapping relationship between a group number and a DRX cycle, the group number of the group to which the first terminal device belongs, and then determine, based on the power saving signal receiving location information of each group of terminal devices, the power saving signal receiving location corresponding to the first terminal device.

For example, the grouping rule is the mapping relationship between a group number and one or more of the following parameters: a terminal device identifier, a quantity of groups, a quantity of paging frames PFs in each DRX cycle, a quantity of POs in each PF, and a weight of each group of terminal devices, the first terminal device may calculate the group number of the first terminal device by using a terminal device identifier of the first terminal device, the quantity of groups, the quantity of paging frames (PF) in each DRX cycle, the quantity of POs in each PF, and the weight of each group of terminal devices according to the foregoing formula (1), and then determine, based on the power saving signal receiving location information of each group of terminal devices, the power saving signal receiving location information corresponding to the first terminal device.

For example, the grouping rule is the mapping relationship between a group number and a paging frequency range. The first terminal device may determine, by using a paging frequency of the first terminal device (that is, a quantity of times that the first terminal device is paged in a paging frequency statistics time period), the group number corresponding to the first terminal device, and then determine, based on the power saving signal receiving location information of each group of terminal devices, the power saving signal receiving location information corresponding to the first terminal device.

For example, the grouping rule is the mapping relationship between a group number and a terminal device category. The first terminal device may first determine a terminal device category of the first terminal device by using a terminal device feature of the first terminal device, and then determine, based on the power saving signal receiving location information of each group of terminal devices, the power saving signal receiving location information corresponding to the first terminal device. The terminal device feature may include at least one of the following: a peak rate, a buffer size, and mobility.

For example, the grouping rule is the mapping relationship between a group number and a channel condition range. The first terminal device may first determine, based on channel condition information of the first terminal device, a channel condition range in which the first terminal device is located, and then determine, based on the power saving signal receiving location information of each group of terminal devices, the power saving signal receiving location information corresponding to the first terminal device.

In an embodiment, when the grouping rule includes a plurality of mapping relationships used for performing a plurality of times of grouping, the first terminal device may sequentially determine a group number for each time of grouping based on the plurality of mapping relationships, and then determine, by using group numbers for a plurality of times of grouping and based on the power saving signal receiving location information of each group of terminal devices, power saving signal receiving location information corresponding to a group number of the first terminal device for a plurality of times of grouping. For example, the network device may subdivide each of two groups of terminal devices obtained through the first time of grouping into two groups of terminal devices, to finally obtain four groups of terminal devices. Group numbers of the four groups of terminal devices may be 0-0, 0-1, 1-0, and 1-1. The group number 0-0 may indicate that a group number of a terminal device for the first time of grouping is 0, and a group number for the second time of grouping is 0. The group number 0-1 may indicate that a group number of a terminal device for the first time of grouping is 0, and a group number for the second time of grouping is 1. The group number 1-0 may indicate that a group number of a terminal device for the first time of grouping is 1, and a group number for the second time of grouping is 0. The group number 1-1 may indicate that a group number of a terminal device for the first time of grouping is 1, and a group number for the second time of grouping is 1. The group numbers of the four groups of terminal devices may be 0-0, 0-1, 1-0, and 1-1, and each may correspond to one power saving signal receiving location. This example is merely used to explain this application and shall not be construed as a limitation. For details, refer to the following Embodiment 6 to Embodiment 9. Details are not described herein.

Power saving signal receiving location information of different groups of terminal devices may be distinguished by using at least one of time domain, frequency domain, and code domain. When only time domain is used for differentiation, power saving signal receiving locations of each group of terminal devices may be distinguished by using only a timing advance relative to the first PO. When only frequency domain is used for differentiation, the network device may send power saving signals for different groups of terminal devices on different frequency bands in a fixed time period ahead of the first PO. When only code domain is used for differentiation, sequences of power saving signals of different groups of terminal devices are different, or the network device uses different scrambling codes when sending power saving signals for different groups of terminal devices.

In this embodiment of this application, the terminal devices associated with the first PO are grouped one or more times according to the foregoing five grouping rules, so that before the first PO, one or more groups of terminal devices that have been paged are woken up by using a power saving signal, and one or more groups of terminal devices that have not been paged are enabled to sleep, thereby reducing total power consumption of the terminal devices associated with the first PO.

When the network device groups, once according to the grouping rule, the terminal devices associated with the first paging occasion PO, for different grouping rules, the following describes in detail, by using Embodiment 1 to Embodiment 5, how to perform grouping and how a terminal device determines a group number of the terminal device and a power saving signal receiving location corresponding to the group number.

Embodiment 1

In this embodiment, a grouping rule may be a mapping relationship between a group number and a discontinuous reception DRX cycle. A group number of each group of terminal devices may correspond to a DRX cycle value or a DRX cycle value set.

In Embodiment 1, if the grouping rule is the mapping relationship between a group number and a DRX cycle, a specific procedure in which a network device groups, once, terminal devices associated with a first PO and the terminal device determines a group number and a power saving signal receiving location corresponding to the group number is as follows:

1. The network device groups, according to a grouping rule, terminal devices associated with a same PO.

The network device may obtain a DRX cycle value of a terminal device associated with the first PO. For example, the network device may obtain the DRX cycle value of the terminal device from an attach request of the terminal device. After obtaining the DRX cycle value of the terminal device associated with the first PO, the network device may group terminal devices whose DRX cycle values are the same into one group, that is, a quantity of DRX cycle values is a quantity of groups. For example, the terminal devices associated with the first PO include UE_1, UE_2, UE_3, UE_4, UE_5, UE_6, UE_7, and UE_8, and DRX cycle values of the eight terminal devices may be shown in Table 1.

TABLE 1

| Terminal device | DRX cycle |
| --- | --- |
| UE_1 | 320 ms |
| UE_2 | 640 ms |
| UE_3 | 1280 ms |
| UE_4 | 2560 ms |

TABLE 1-continued

| Terminal device | DRX cycle |
|---|---|
| UE_5 | 320 ms |
| UE_6 | 640 ms |
| UE_7 | 1280 ms |
| UE_8 | 2560 ms |

As shown in Table 1, DRX cycle values of the UE_1 and the UE_5 are 320 ms, DRX cycle values of the UE_2 and the UE_6 are 640 m, DRX cycle values of the UE_3 and the UE_7 are 1280 ms, and DRX cycle values of the UE_4 and the UE_8 are 2560 ms. The example shown in Table 1 is merely used to explain this application and shall not be construed as a limitation.

Figure 5A:
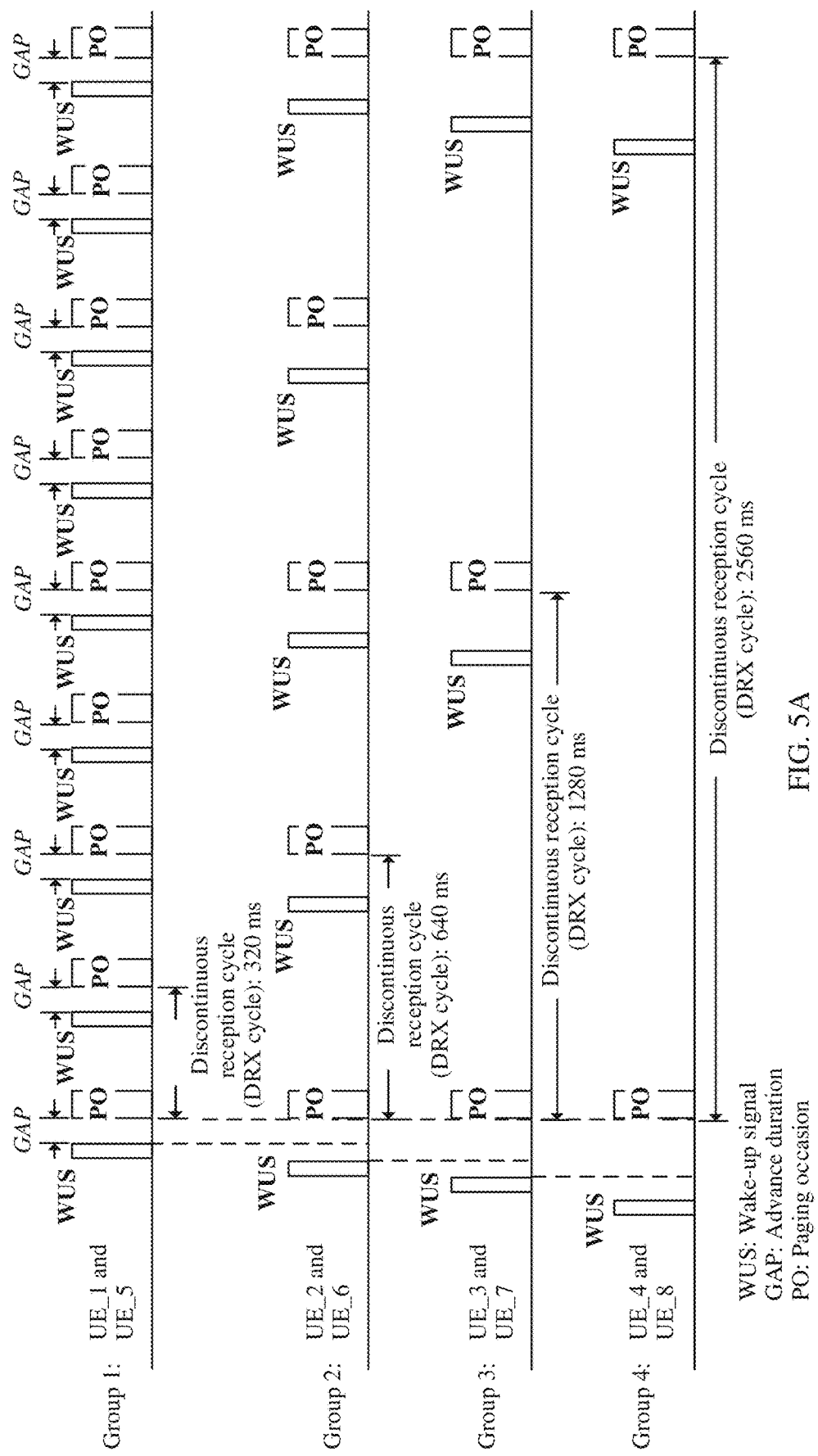
FIG. 5A is a schematic diagram of grouping based on a DRX cycle value of a terminal device according to this application.

FIG. 5A is a schematic diagram of grouping based on a DRX cycle value of a terminal device. As shown in FIG. 5A, power saving signal receiving location information of different groups of terminal devices is distinguished by using time domain. The network device groups terminal devices whose DRX cycle values are 320 ms into one group, that is, the network device groups the terminal devices UE_1 and UE_5 into one group. The network device groups terminal devices whose DRX cycle values are 640 ms into one group, that is, the network device groups the terminal devices UE_2 and UE_6 into one group. The network device groups terminal devices whose DRX cycle values are 1280 ms into one group, that is, the network device groups the terminal devices UE_3 and UE_7 into one group. The network device groups terminal devices whose DRX cycle values are 2560 ms into one group, that is, the network device groups the terminal devices UE_4 and UE_8 into one group. Therefore, the network device groups, into four groups by using the DRX cycle values of the terminal devices, the eight terminal devices UE_1, UE_2, UE_3, UE_4, UE_5, UE_6, UE_7, and UE_8 that are associated with the first PO. A mapping relationship between group numbers of the four groups of terminal devices and DRX cycles may be shown in Table 2.

TABLE 2

| Group number | DRX cycle |
|---|---|
| 0 | 320 ms |
| 1 | 640 ms |
| 2 | 1280 ms |
| 3 | 2560 ms |

It can be learned from Table 1 and Table 2 that, a group number of the terminal devices UE_1 and UE_5 is 0, a group number of the terminal devices UE_2 and UE_6 is 1, a group number of the terminal devices UE_3 and UE_7 is 2, and a group number of the terminal devices UE_4 and UE_8 is 3. The example shown in Table 2 is merely used to explain this application and shall not be construed as a limitation.

Figure 5B:
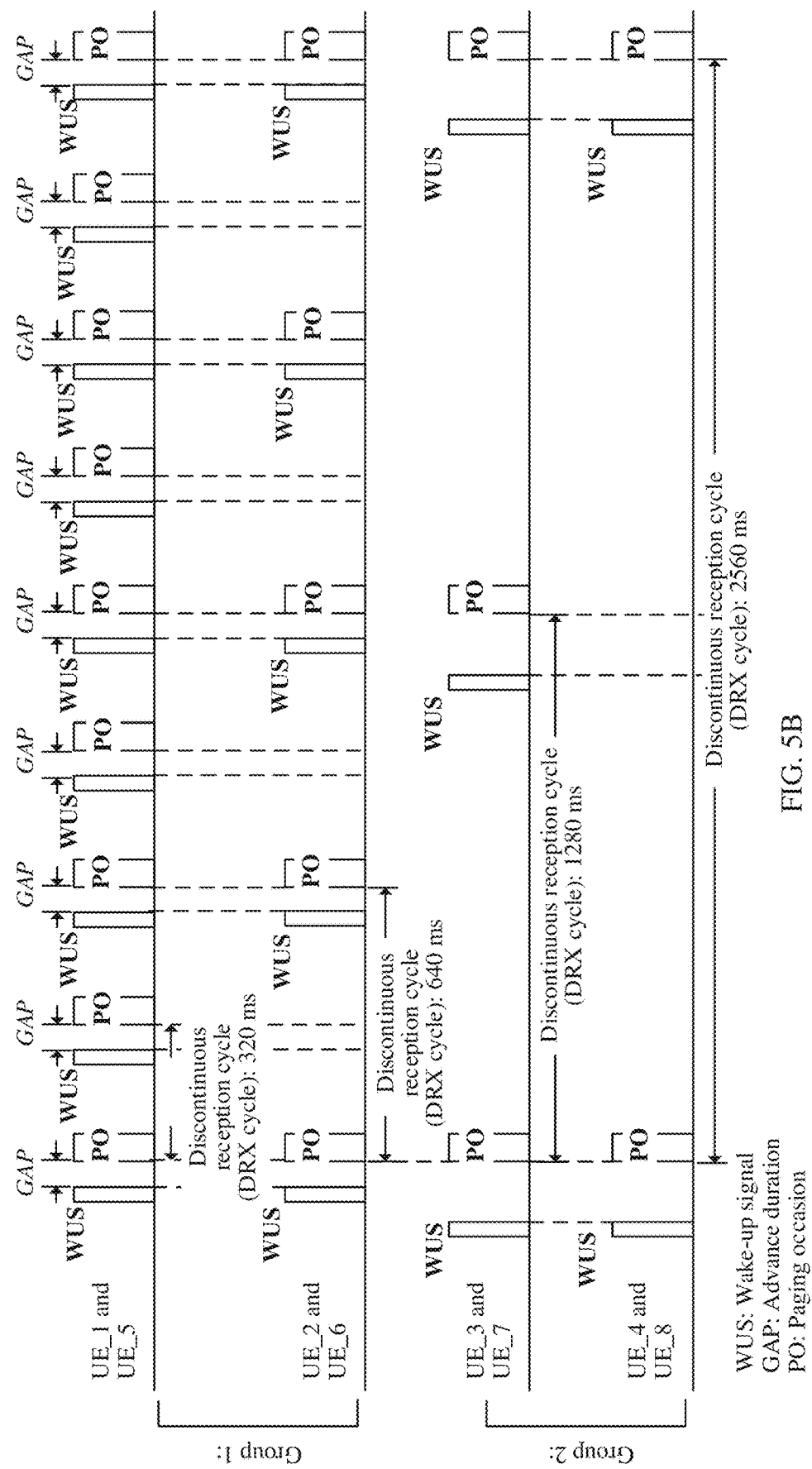
FIG. 5B is a schematic diagram of grouping based on a DRX cycle value set of a terminal device according to this application.

FIG. 5B is a schematic diagram of grouping based on a DRX cycle value set of a terminal device. As shown in FIG. 5B, power saving signal receiving location information of different groups of terminal devices is distinguished by using time domain. The network device groups terminal devices whose DRX cycle value set is 320 ms and 640 ms into one group, that is, the network device groups the terminal devices UE_1, UE_2, UE_5, and UE_6 into one group, and the network device groups terminal devices whose DRX cycle value set is 1280 ms and 2560 ms into one group, that is, the network device groups the terminal devices UE_3, UE_4, UE_7, and UE_8 into one group. Therefore, the network device groups, into two groups by using the DRX cycle values of the terminal devices, the eight terminal devices UE_1, UE_2, UE_3, UE_4, UE_5, UE_6, UE_7, and UE_8 that are associated with the first PO. A mapping relationship between group numbers of the two groups of terminal devices and DRX cycles may be shown in Table 3.

TABLE 3

| Group number | DRX cycle |
|---|---|
| 0 | 320 ms and 640 ms |
| 1 | 1280 ms and 2560 ms |

It can be learned from Table 1 and Table 3 that a group number of the terminal devices UE_1, UE_2, UE_5, and UE_6 is 0, and a group number of the terminal devices UE_3, UE_4, UE_7, and UE_8 is 1. The example shown in Table 3 is merely used to explain this application and shall not be construed as a limitation.

In an embodiment, in a system scenario in which DRX cycle values of terminal devices associated with a same PO are in a non-integer multiple relationship, UEs whose DRX cycle values are in a non-integer multiple relationship are grouped into different groups, so that total power consumption of the terminal devices can be reduced, and power saving signal receiving locations of each group of terminal devices can be more conveniently determined.

2. The network device configures corresponding power signal receiving location information for each group of terminal devices.

Power saving signal receiving location information of different groups of terminal devices may be distinguished by using at least one of time domain, frequency domain, and code domain. When only time domain is used for differentiation, power saving signal receiving locations of each group of terminal devices may be distinguished by using only a timing advance relative to the first PO. When only frequency domain is used for differentiation, the network device may send power saving signals for different groups of terminal devices on different frequency bands in a fixed time period ahead of the first PO. When only code domain is used for differentiation, sequences of power saving signals of different groups of terminal devices are different, or the network device uses different scrambling codes when sending power saving signals for different groups of terminal devices.

The following uses two groups of terminal devices as an example to describe how the network device configures power saving signal receiving location information for each group of terminal devices.

When only time domain is used for differentiation, a correspondence between a group number and power saving signal receiving location information that are of each group of terminal devices may be shown in Table 4.

TABLE 4

| Group number | Power saving signal receiving location information |
|---|---|
| 0 | Location of 50 ms ahead of the first PO |
| 1 | Location of 53 ms ahead of the first PO |

It can be learned from Table 4 that the power saving signal receiving location information corresponding to the group 0 of terminal devices is the location of 50 ms ahead of the first PO. The power saving signal receiving location information corresponding to the group 1 of terminal devices is the location of 53 ms ahead of the first PO. The example shown in Table 4 is merely used to explain this application and shall not be construed as a limitation.

When only frequency domain is used for differentiation, a correspondence between a group number and power saving signal receiving location information that are of each group of terminal devices may be shown in Table 5.

TABLE 5

| Group number | Power saving signal receiving location information |
|---|---|
| 0 | Frequency band of 2111.1 MHz to 2111.2 MHz used for a power saving signal |
| 1 | Frequency band of 2111.2 MHz to 2111.3 MHz used for a power saving signal |

It can be learned from Table 5 that the power saving signal receiving location information corresponding to the group 0 of terminal devices is the frequency band of 2111.1 MHz to 2111.2 MHz used for a power saving signal. The power saving signal receiving location information corresponding to the group 1 of terminal devices is the frequency band of 2111.2 MHz to 2111.3 MHz used for a power saving signal. The example shown in Table 5 is merely used to explain this application and shall not be construed as a limitation.

When only code domain is used for differentiation, a correspondence between a group number and power saving signal receiving location information that are of each group of terminal devices may be shown in Table 6.

TABLE 6

| Group number | Power saving signal receiving location information |
|---|---|
| 0 | Use a scrambling code 1 |
| 1 | Use a scrambling code 2 |

It can be learned from Table 6 that the power saving signal receiving location information corresponding to the group 0 of terminal devices is to use the scrambling code 1. The power saving signal receiving location information corresponding to the group 1 of terminal devices is to use the scrambling code 2. The example shown in Table 6 is merely used to explain this application and shall not be construed as a limitation.

The power saving signal receiving location information may be alternatively distinguished by using two or more of time domain, frequency domain, or code domain. For example, when time domain and frequency domain are used for differentiation, a correspondence between a group number and power saving signal receiving location information that are of each group of terminal devices may be shown in Table 7.

TABLE 7

| Group number | Power saving signal receiving location information |
|---|---|
| 0 | Location of 50 ms ahead of the first PO Frequency band of 2111.1 MHz to 2111.2 MHz used for a power saving signal |
| 1 | Location of 53 ms ahead of the first PO Frequency band of 2111.2 MHz to 2111.3 MHz used for a power saving signal |

It can be learned from Table 7 that the power saving signal receiving location information corresponding to the group 0 of terminal devices is the location of 50 ms ahead of the first PO and the frequency band of 2111.1 MHz to 2111.2 MHz used for a power saving signal. The power saving signal receiving location information corresponding to the group 1 of terminal devices is the location of 53 ms ahead of the first PO and the frequency band of 2111.2 MHz to 2111.3 MHz used for a power saving signal. The example shown in Table 7 is merely used to explain this application and shall not be construed as a limitation.

3. The network device notifies the terminal device of the grouping rule and the power signal receiving location information of each group of terminal devices.

The network device may notify, by using system information, all terminal devices associated with the first PO of the grouping rule and the power saving signal receiving location information of each group of terminal devices. A power saving signal may include a wake-up signal or a go-to-sleep signal.

The terminal device may receive, by using the system information, the grouping rule and the power saving signal receiving location information of each group of terminal devices that are notified by the network device.

4. The terminal device determines, based on a DRX cycle of the terminal device, a group number corresponding to the terminal device and power saving signal receiving location information corresponding to the group number.

After receiving the grouping rule and the power saving signal receiving location information corresponding to each group of terminal devices that are sent by the network device, the terminal device determines, based on the DRX cycle of the terminal device, the group number corresponding to the terminal device and a power saving signal receiving location corresponding to the group number. For example, a DRX cycle of the terminal device UE_1 is 320 ms. It is assumed that when a grouping rule received by the UE_1 is shown in Table 2, and the power saving signal receiving location information of each group of terminal devices received by the UE_1 is shown in Table 4, a group number corresponding to the DRX cycle 320 ms of the UE_1 is 0, so that it can be determined that the group number of the UE_1 is 0. Then, it may be determined, based on Table 4, that power saving signal receiving location information corresponding to the UE_1 is to receive a power saving signal at the location of 50 ms ahead of the first PO. The foregoing example is merely used to explain this application and shall not be construed as a limitation.

In Embodiment 1 of this application, because a DRX cycle may reflect a service density of a terminal device to some extent, for terminal devices associated with a same PO, terminal devices whose DRX cycles are the same or similar may be grouped into a same group, so that a probability that each group of terminal devices are simultaneously paged is increased, or in other words, a false alarm probability is reduced, thereby reducing total power consumption of the terminal devices associated with the same PO.

Embodiment 2

In this embodiment, a grouping rule may be a mapping relationship between a group number and one or more of the following parameters: a terminal device identifier, a quantity of groups, a quantity of paging frames PFs in each DRX cycle, a quantity of POs in each PF, and a weight of each group of terminal devices. The group number may be a minimum index value n that meets the following formula (2):

$$\text{floor}(UE\_ID/(N*Ns)) \bmod g < g(0) + g(1) + \ldots + g(n) \quad \text{Formula (2)}$$

In the foregoing formula (2), UE_ID is the terminal device identifier, g(n) is a weight of a user group whose group number is n, g(n) is an integer, and g(0)+ g(1)+ . . . +g(G−1)=g, where G is the quantity of groups, a value range of the minimum index value n is 0≤n≤G−1, N is the quantity of paging frames PFs in each DRX cycle, and Ns is the quantity of POs in each PF.

In Embodiment 2, if the grouping rule is the mapping relationship between a group number and one or more of the following parameters: a terminal device identifier, a quantity of groups, a quantity of paging frames PFs in each DRX cycle, a quantity of POs in each PF, and a weight of each group of terminal devices, a specific procedure in which a network device groups, once, terminal devices associated with a first PO and the terminal device determines a group number and a power signal receiving location corresponding to the group number is as follows:

1. The network device groups, according to a grouping rule, terminal devices associated with a same PO.

For example, it is assumed that the terminal devices associated with the first PO may include UE_1, UE_2, UE_3, UE_4, UE_5, UE_6, UE_7, and UE_8. The network device needs to group the eight terminal devices into four groups, that is, the quantity G of groups is 4. Terminal device identifiers UE_IDs of the eight terminal devices, the quantity N of paging frames PFs in each DRX cycle, and the quantity Ns of POs in each PF may be shown in Table 8. UE_ID may be an international mobile subscriber identity (IMSI)mod 1024 of a terminal device, namely, IMSI mod 1024, but shall not be construed as a limitation.

TABLE 8

| Terminal device | UE_ID (IMSI mod 1024) | N | Ns |
|---|---|---|---|
| UE_1 | 450 | 32 | 2 |
| UE_2 | 388 | 32 | 2 |
| UE_3 | 641 | 32 | 2 |
| UE_4 | 650 | 32 | 2 |
| UE_5 | 708 | 32 | 2 |
| UE_6 | 897 | 32 | 2 |
| UE_7 | 770 | 32 | 2 |
| UE_8 | 257 | 32 | 2 |

As shown in Table 8, it can be learned that a terminal device identifier UE_ID of the terminal device UE_1 is 450, N corresponding to the UE_1 is 32, and Ns corresponding to the UE_1 is 2; a terminal device identifier UE_ID of the terminal device UE_2 is 388, N corresponding to the UE_2 is 32, and Ns corresponding to the UE_2 is 2; a terminal device identifier UE_ID of the terminal device UE_3 is 641, N corresponding to the UE_3 is 32, and Ns corresponding to the UE_3 is 2; a terminal device identifier UE_ID of the terminal device UE_4 is 650, N corresponding to the UE_4 is 32, and Ns corresponding to the UE_4 is 2; a terminal device identifier UE_ID of the terminal device UE_5 is 708, N corresponding to the UE_5 is 32, and Ns corresponding to the UE_5 is 2; a terminal device identifier UE_ID of the terminal device UE_6 is 897, N corresponding to the UE_6 is 32, and Ns corresponding to the UE_6 is 2; a terminal device identifier UE_ID of the terminal device UE_7 is 770, N corresponding to the UE_7 is 32, and Ns corresponding to the UE_7 is 2; and a terminal device identifier UE_ID of the terminal device UE_8 is 257, N corresponding to the UE_8 is 32, and Ns corresponding to the UE_8 is 2. The example shown in Table 8 is merely used to explain this application and shall not be construed as a limitation.

Weight values corresponding to group numbers of the foregoing four groups of terminal devices may be shown in Table 9.

TABLE 9

| Group number (n) | Weight value (g(n)) |
|---|---|
| 0 | 1 |
| 1 | 2 |
| 2 | 3 |
| 3 | 4 |

It can be learned from Table 9 that weight values g(0), g(1), g(2), and g(3) of the four groups are 1, 2, 3, and 4. The example shown in Table 9 is merely used to explain this application and shall not be construed as a limitation.

A group number of each terminal device may be calculated by substituting UE_ID of each terminal device, N, and Ns shown in Table 8, the quantity G of groups, and the weight value corresponding to each group of terminal devices shown in Table 9 into the foregoing formula (2), and the calculated group number of each terminal device may be shown in Table 10.

TABLE 10

| Terminal device | Group number |
|---|---|
| UE_1 | 3 |
| UE_2 | 3 |
| UE_3 | 0 |
| UE_4 | 0 |
| UE_5 | 1 |
| UE_6 | 2 |
| UE_7 | 1 |
| UE_8 | 2 |

It can be learned from Table 10 that, the terminal devices UE_1 and UE_2 are grouped into a group 3, the terminal devices UE_3 and UE_4 are grouped into a group 0, the terminal devices UE_5 and UE_7 are grouped into a group 1, and the terminal devices UE_6 and UE_8 are grouped into a group 2. The example shown in Table 10 is merely used to explain this application and shall not be construed as a limitation.

2. The network device configures corresponding power signal receiving location information for each group of terminal devices.

Power saving signal receiving location information of different groups of terminal devices may be distinguished by using at least one of time domain, frequency domain, and code domain. When only time domain is used for differentiation, power saving signal receiving locations of each group of terminal devices may be distinguished by using only a timing advance relative to the first PO. When only frequency domain is used for differentiation, the network device may send power saving signals for different groups of terminal devices on different frequency bands in a fixed time period ahead of the first PO. When only code domain is used for differentiation, sequences of power saving signals of different groups of terminal devices are different, or the network device uses different scrambling codes when sending power saving signals for different groups of terminal devices.

The following uses four groups of terminal devices as an example to describe how the network device configures power saving signal receiving location information for each group of terminal devices.

When only time domain is used for differentiation, a correspondence between a group number and power saving signal receiving location information that are of each group of terminal devices may be shown in Table 11.

TABLE 11

| Group number | Power saving signal receiving location information |
|---|---|
| 0 | Location of 50 ms ahead of the first PO |
| 1 | Location of 53 ms ahead of the first PO |
| 2 | Location of 56 ms ahead of the first PO |
| 3 | Location of 59 ms ahead of the first PO |

It can be learned from Table 11 that the power saving signal receiving location information corresponding to the group 0 of terminal devices is the location of 50 ms ahead of the first PO. The power saving signal receiving location information corresponding to the group 1 of terminal devices is the location of 53 ms ahead of the first PO. The power saving signal receiving location information corresponding to the group 2 of terminal devices is the location of 56 ms ahead of the first PO. The power saving signal receiving location information corresponding to the group 3 of terminal devices is the location of 59 ms ahead of the first PO. The example shown in Table 11 is merely used to explain this application and shall not be construed as a limitation.

When only frequency domain is used for differentiation, a correspondence between a group number and power saving signal receiving location information that are of each group of terminal devices may be shown in Table 12.

TABLE 12

| Group number | Power saving signal receiving location information |
|---|---|
| 0 | Frequency band of 2111.1 MHz to 2111.2 MHz used for a power saving signal |
| 1 | Frequency band of 2111.2 MHz to 2111.3 MHz used for a power saving signal |
| 2 | Frequency band of 2111.3 MHz to 2111.4 MHz used for a power saving signal |
| 3 | Frequency band of 2111.4 MHz to 2111.5 MHz used for a power saving signal |

It can be learned from Table 12 that the power saving signal receiving location information corresponding to the group 0 of terminal devices is the frequency band of 2111.1 MHz to 2111.2 MHz used for a power saving signal. The power saving signal receiving location information corresponding to the group 1 of terminal devices is the frequency band of 2111.2 MHz to 2111.3 MHz used for a power saving signal. The power saving signal receiving location information corresponding to the group 2 of terminal devices is the frequency band of 2111.3 MHz to 2111.4 MHz used for a power saving signal. The power saving signal receiving location information corresponding to the group 3 of terminal devices is the frequency band of 2111.4 MHz to 2111.5 MHz used for a power saving signal. The example shown in Table 12 is merely used to explain this application and shall not be construed as a limitation.

When only code domain is used for differentiation, a correspondence between a group number and power saving signal receiving location information that are of each group of terminal devices may be shown in Table 13.

TABLE 13

| Group number | Power saving signal receiving location information |
|---|---|
| 0 | Use a scrambling code 1 |
| 1 | Use a scrambling code 2 |
| 2 | Use a scrambling code 3 |
| 3 | Use a scrambling code 4 |

It can be learned from Table 13 that the power saving signal receiving location information corresponding to the group 0 of terminal devices is to use the scrambling code 1. The power saving signal receiving location information corresponding to the group 1 of terminal devices is to use the scrambling code 2. The power saving signal receiving location information corresponding to the group 2 of terminal devices is to use the scrambling code 2. The power saving signal receiving location information corresponding to the group 3 of terminal devices is to use the scrambling code 2. The example shown in Table 13 is merely used to explain this application and shall not be construed as a limitation.

The power saving signal receiving location information may be alternatively distinguished by using two or more of time domain, frequency domain, or code domain. For example, when time domain and frequency domain are used for differentiation, a correspondence between a group number and power saving signal receiving location information that are of each group of terminal devices may be shown in Table 14.

TABLE 14

| Group number | Power saving signal receiving location information |
|---|---|
| 0 | Location of 50 ms ahead of the first PO Frequency band of 2111.1 MHz to 2111.2 MHz used for a power saving signal |
| 1 | Location of 50 ms ahead of the first PO Frequency band of 2111.2 MHz to 2111.3 MHz used for a power saving signal |
| 2 | Location of 53 ms ahead of the first PO Frequency band of 2111.1 MHz to 2111.2 MHz used for a power saving signal |
| 3 | Location of 53 ms ahead of the first PO Frequency band of 2111.2 MHz to 2111.3 MHz used for a power saving signal |

It can be learned from Table 14 that the power saving signal receiving location information corresponding to the group 0 of terminal devices is the location of 50 ms ahead of the first PO and the frequency band of 2111.1 MHz to 2111.2 MHz used for a power saving signal. The power saving signal receiving location information corresponding to the group 1 of terminal devices is the location of 50 ms ahead of the first PO and the frequency band of 2111.2 MHz to 2111.3 MHz used for a power saving signal. The power saving signal receiving location information corresponding to the group 2 of terminal devices is the location of 53 ms ahead of the first PO and the frequency band of 2111.1 MHz to 2111.2 MHz used for a power saving signal. The power saving signal receiving location information corresponding to the group 3 of terminal devices is the location of 53 ms ahead of the first PO and the frequency band of 2111.2 MHz to 2111.3 MHz used for a power saving signal. The example shown in Table 14 is merely used to explain this application and shall not be construed as a limitation.

3. The network device notifies the terminal device of the grouping rule and the power signal receiving location information of each group of terminal devices.

The network device may notify, by using system information, all terminal devices associated with the first PO of the grouping rule and the power saving signal receiving location information of each group of terminal devices. A power saving signal may include a wake-up signal or a go-to-sleep signal.

The terminal device may receive, by using the system information, the grouping rule and the power saving signal receiving location information of each group of terminal devices that are notified by the network device.

4. The terminal device determines, based on one or more of the following parameters: a terminal device identifier of the terminal device, a quantity of paging frames PFs in each DRX cycle, a quantity of POs in each PF, a quantity of groups, and a weight value corresponding to each group of terminal devices, a group number corresponding to the terminal device and power saving signal receiving location information corresponding to the group number.

For example, a terminal device identifier UE_ID of the terminal device UE_1 may be 209, N corresponding to the UE_1 may be 32, Ns corresponding to the UE_1 may be 1, the quantity G of groups may be 4, and weight values g(0), g(1), g(2), and g(3) of the four groups are 1, 2, 3, and 4. In this case, a group number 3 corresponding to the terminal device UE_1 may be calculated by using the foregoing formula (2), and then it may be determined, based on Table 11, that power saving signal receiving location information corresponding to the UE_1 is to receive a power saving signal at the location of 59 ms ahead of the first PO. The foregoing example is merely used to explain this application and shall not be construed as a limitation.

In an embodiment, if the network device updates one or more of the following parameters: the quantity N of paging frames PFs in each DRX cycle, the quantity Ns of POs in each PF, the quantity of groups, and the weight corresponding to each group of terminal devices, the terminal device may receive the updated parameter sent by the network device. For example, before the network device updates the foregoing parameters, N is 32, Ns is 2, the quantity of groups is 2, and weights g(0) and g(1) corresponding to each group of terminal devices are 1 and 2. After the network device updates the foregoing parameters, N is 32, Ns is 2, the quantity of groups is 4, and weights g(0), g(1), g(2), and g(3) corresponding to each group of terminal devices are 1, 2, 3, and 4. In this case, the terminal device may receive the updated quantity (4) of groups and the updated weight g(0), g(1), g(2), or g(3) (1, 2, 3, or 4) corresponding to each group of terminal devices that are sent by the network device.

In an embodiment, the network device may adjust a false alarm rate of each group of terminal devices by adjusting the weight of each group of terminal devices. The false alarm rate includes a ratio of a quantity of times that any terminal device in one group of terminal devices is woken up but is not paged to a quantity of times that any terminal device in the group of terminal devices is woken up in a first time period. An average false alarm rate of one group of terminal devices may be a ratio of an average quantity of times that each terminal device in the group of terminal devices is woken up but is not paged to a quantity of times that any terminal device in the group of terminal devices is woken up. For example, when the weight values g(0), g(1), g(2), and g(3) of the four groups are 1, 2, 3, and 4, UE_ID of the terminal device UE_1 is 450, N corresponding to the UE_1 is 32, and Ns corresponding to the UE_1 is 2; and UE_ID of the terminal device UE_2 is 388, N corresponding to the UE_2 is 32, and Ns corresponding to the UE_2 is 2. It may be calculated by using the foregoing formula (2) that both the UE_1 and the UE_2 belong to the group 3. In the first time period, the group 3 may be woken up four times, the UE_1 may be paged four times, and the UE_2 may not be paged. Therefore, an average false alarm rate of the group 3 is 50%. When the weight values g(0), g(1), g(2), and g(3) of the four groups are 1, 2, 4, and 3, UE_ID of the terminal device UE_1 is 450, N corresponding to the UE_1 is 32, and Ns corresponding to the UE_1 is 2; and UE_ID of the terminal device UE_2 is 388, N corresponding to the UE_2 is 32, and Ns corresponding to the UE_2 is 2. It may be calculated by using the foregoing formula (2) that the UE_1 belongs to the group 2 and the UE_2 belongs to the group 3. In the first time period, if the group 3 is woken up four times, the UE_1 is paged four times, and the UE_2 is not paged, a false alarm rate of the group 3 is 0%. Therefore, the false alarm rate of each group of terminal devices may be adjusted by adjusting the weight value, thereby reducing total power consumption of the terminal devices. The foregoing example is merely used to explain this application and shall not be construed as a limitation.

In Embodiment 2 of this application, a corresponding weight value is set for each group of terminal devices, and then terminal devices associated with a same PO may be grouped one or more times by using the foregoing formula (2). When paging arrives, only a terminal device group that has been paged can be woken up, and a terminal device group that has not been paged can be enabled to sleep, thereby reducing total power consumption of the terminal devices. Alternatively, the false alarm rate of each group of terminal devices may be adjusted by adjusting the weight, thereby further reducing total power consumption of one or more groups of terminal devices. For example, if a false alarm probability of a group 0 is too high, a weight value of the group 0 may be reduced through adjustment, so that some terminal devices originally grouped into the group 0 are grouped into another group, thereby reducing the false alarm rate of the group 0, that is, reducing total power consumption of terminal devices in the group 0.

Embodiment 3

In this embodiment, a grouping rule may be a mapping relationship between a group number and a paging frequency range. A paging frequency is an average quantity of times that a terminal device is paged in a unit time in a statistics time period determined according to a paging frequency statistics rule. The paging frequency statistics rule may be notified by a network device to the terminal device, or may be a statistics rule configured according to a static protocol in the network device and the terminal device. This is not limited herein.

In Embodiment 3, if the grouping rule is the mapping relationship between a group number and a paging frequency range, a specific procedure in which the network device groups, once, terminal devices associated with a first PO and the terminal device determines a group number and a power saving receiving location corresponding to the group number is as follows:

1. The network device groups, according to a grouping rule, terminal devices associated with a same PO.

The network device may first obtain a quantity of groups for each time of grouping, and delimit a plurality of paging frequency ranges based on the quantity of groups. In an embodiment, the network device may first delimit at least one paging frequency range, and then perform grouping, where a quantity of groups for each time of grouping is the same as a quantity of paging frequency ranges. Each group of terminal devices may correspond to one paging frequency range. A paging frequency may be a quantity of times that a terminal device is paged in a paging frequency statistics time period. The network device may further notify all terminal devices associated with the first PO of the paging statistics time period. The paging statistics time period may be a month before the network device notifies the grouping rule, may be the first day of each month, or may be a specified hour in a day. This shall not be construed as a limitation herein.

For example, it is assumed that the network device needs to group the terminal devices associated with the first PO into four groups. Therefore, the network device needs to delimit four paging frequency ranges. If a paging frequency is an average quantity of times that a terminal is paged per hour in a day, the four paging frequency ranges are 0 to 10 times, 11 to 15 times, 21 to 30 times, and 31 or more times. This example is merely used to explain this application and shall not be construed as a limitation. In an embodiment, the network device may first count a quantity of paging frequency times of the terminal device associated with the first PO, and then delimit at least one paging frequency range. A quantity of groups is the same as a quantity of paging frequency ranges. For example, the terminal devices associated with the first PO may include UE_1, UE_2, UE_3, UE_4, UE_5, UE_6, UE_7, and UE_8. Paging frequencies of the eight terminal devices may be shown in Table 15.

TABLE 15

| Terminal device | Paging frequency (times/hour) |
|---|---|
| UE_1 | 3 |
| UE_2 | 14 |
| UE_3 | 27 |
| UE_4 | 36 |
| UE_5 | 8 |
| UE_6 | 15 |
| UE_7 | 28 |
| UE_8 | 39 |

As shown in Table 15, the paging frequency of the terminal device UE_1 is 3 times/hour, the paging frequency of the UE_2 is 14 times/hour, the paging frequency of the UE_3 is 27 times/hour, the paging frequency of the UE_4 is 36 times/hour, the paging frequency of the UE_5 is 8 times/hour, the paging frequency of the UE_6 is 15 times/hour, the paging frequency of the UE_7 is 28 times/hour, and the paging frequency of the UE_8 is 39 times/hour. The example shown in Table 15 is merely used to explain this application and shall not be construed as a limitation.

The network device may delimit four paging frequency ranges based on Table 15. The four paging frequency ranges are 0-10 times/hour, 11-20 times/hour, 21-30 times/hour, and 31 to 40 times/hour. The mapping relationship between a group number and a paging frequency range may be shown in Table 16.

TABLE 16

| Group number | Paging frequency range (times/hour) |
|---|---|
| 0 | 0-10 |
| 1 | 11-20 |
| 2 | 21-30 |
| 3 | 31-40 |

It can be learned from Table 15 and Table 16 that, a group number of the terminal devices UE_1 and UE_5 is 0, a group number of the terminal devices UE_2 and UE_6 is 1, a group number of the terminal devices UE_3 and UE_7 is 2, and a group number of the terminal devices UE_4 and UE_8 is 3. The example shown in Table 16 is merely used to explain this application and shall not be construed as a limitation.

2. The network device configures corresponding power saving signal receiving location information for each group of terminal devices.

Power saving signal receiving location information of different groups of terminal devices may be distinguished by using at least one of time domain, frequency domain, and code domain. When only time domain is used for differentiation, power saving signal receiving locations of each group of terminal devices may be distinguished by using only a timing advance relative to the first PO. When only frequency domain is used for differentiation, the network device may send power saving signals for different groups of terminal devices on different frequency bands in a fixed time period ahead of the first PO. When only code domain is used for differentiation, sequences of power saving signals of different groups of terminal devices are different, or the network device uses different scrambling codes when sending power saving signals for different groups of terminal devices.

The following uses two groups of terminal devices as an example to describe how the network device configures power saving signal receiving location information for each group of terminal devices.

When only time domain is used for differentiation, a correspondence between a group number and power saving signal receiving location information that are of each group of terminal devices may be shown in Table 17.

TABLE 17

| Group number | Power saving signal receiving location information |
|---|---|
| 0 | Location of 50 ms ahead of the first PO |
| 1 | Location of 53 ms ahead of the first PO |
| 2 | Location of 56 ms ahead of the first PO |
| 3 | Location of 59 ms ahead of the first PO |

It can be learned from Table 17 that the power saving signal receiving location information corresponding to the group 0 of terminal devices is the location of 50 ms ahead of the first PO. The power saving signal receiving location information corresponding to the group 1 of terminal devices is the location of 53 ms ahead of the first PO. The power saving signal receiving location information corresponding to the group 2 of terminal devices is the location of 56 ms ahead of the first PO. The power saving signal receiving location information corresponding to the group 3 of terminal devices is the location of 59 ms ahead of the first PO. The example shown in Table 17 is merely used to explain this application and shall not be construed as a limitation.

When only frequency domain is used for differentiation, a correspondence between a group number and power saving signal receiving location information that are of each group of terminal devices may be shown in Table 18.

TABLE 18

| Group number | Power saving signal receiving location information |
|---|---|
| 0 | Frequency band of 2111.1 MHz to 2111.2 MHz used for a power saving signal |
| 1 | Frequency band of 2111.2 MHz to 2111.3 MHz used for a power saving signal |

TABLE 18-continued

| Group number | Power saving signal receiving location information |
| --- | --- |
| 2 | Frequency band of 2111.3 MHz to 2111.4 MHz used for a power saving signal |
| 3 | Frequency band of 2111.4 MHz to 2111.5 MHz used for a power saving signal |

It can be learned from Table 18 that the power saving signal receiving location information corresponding to the group 0 of terminal devices is the frequency band of 2111.1 MHz to 2111.2 MHz used for a power saving signal. The power saving signal receiving location information corresponding to the group 1 of terminal devices is the frequency band of 2111.2 MHz to 2111.3 MHz used for a power saving signal. The power saving signal receiving location information corresponding to the group 2 of terminal devices is the frequency band of 2111.3 MHz to 2111.4 MHz used for a power saving signal. The power saving signal receiving location information corresponding to the group 3 of terminal devices is the frequency band of 2111.4 MHz to 2111.5 MHz used for a power saving signal. The example shown in Table 18 is merely used to explain this application and shall not be construed as a limitation.

When only code domain is used for differentiation, a correspondence between a group number and power saving signal receiving location information that are of each group of terminal devices may be shown in Table 19.

TABLE 19

| Group number | Power saving signal receiving location information |
| --- | --- |
| 0 | Use a scrambling code 1 |
| 1 | Use a scrambling code 2 |
| 2 | Use a scrambling code 3 |
| 3 | Use a scrambling code 4 |

It can be learned from Table 19 that the power saving signal receiving location information corresponding to the group 0 of terminal devices is to use the scrambling code 1. The power saving signal receiving location information corresponding to the group 1 of terminal devices is to use the scrambling code 2. The power saving signal receiving location information corresponding to the group 2 of terminal devices is to use the scrambling code 2. The power saving signal receiving location information corresponding to the group 3 of terminal devices is to use the scrambling code 2. The example shown in Table 19 is merely used to explain this application and shall not be construed as a limitation.

The power saving signal receiving location information may be alternatively distinguished by using two or more of time domain, frequency domain, or code domain. For example, when time domain and frequency domain are used for differentiation, a correspondence between a group number and power saving signal receiving location information that are of each group of terminal devices may be shown in Table 20.

TABLE 20

| Group number | Power saving signal receiving location information |
| --- | --- |
| 0 | Location of 50 ms ahead of the first PO Frequency band of 2111.1 MHz to 2111.2 MHz used for a power saving signal |

TABLE 20-continued

| Group number | Power saving signal receiving location information |
| --- | --- |
| 1 | Location of 50 ms ahead of the first PO Frequency band of 2111.2 MHz to 2111.3 MHz used for a power saving signal |
| 2 | Location of 53 ms ahead of the first PO Frequency band of 2111.1 MHz to 2111.2 MHz used for a power saving signal |
| 3 | Location of 53 ms ahead of the first PO Frequency band of 2111.2 MHz to 2111.3 MHz used for a power saving signal |

It can be learned from Table 20 that the power saving signal receiving location information corresponding to the group 0 of terminal devices is the location of 50 ms ahead of the first PO and the frequency band of 2111.1 MHz to 2111.2 MHz used for a power saving signal. The power saving signal receiving location corresponding to the group 1 of terminal devices is the location of 50 ms ahead of the first PO and the frequency band of 2111.2 MHz to 2111.3 MHz used for a power saving signal. The power saving signal receiving location corresponding to the group 2 of terminal devices is the location of 53 ms ahead of the first PO and the frequency band of 2111.1 MHz to 2111.2 MHz used for a power saving signal. The power saving signal receiving location corresponding to the group 3 of terminal devices is the location of 53 ms ahead of the first PO and the frequency band of 2111.2 MHz to 2111.3 MHz used for a power saving signal. The example shown in Table 20 is merely used to explain this application and shall not be construed as a limitation.

3. The network device notifies the terminal device of the grouping rule and the power signal receiving location information of each group of terminal devices.

The network device may notify, by using system information, all terminal devices associated with the first PO of the grouping rule and the power saving signal receiving location information of each group of terminal devices. A power saving signal may include a wake-up signal or a go-to-sleep signal.

The terminal device may receive, by using the system information, the grouping rule and the power saving signal receiving location information of each group of terminal devices that are notified by the network device.

4. The terminal device determines, based on a paging frequency of the terminal device, a group number corresponding to the terminal device and power saving signal receiving location information corresponding to the group number.

After receiving the grouping rule and the power saving signal receiving location information corresponding to each group of terminal devices that are sent by the network device, the terminal device determines, based on the paging frequency of the terminal device, the group number corresponding to the terminal device and a power saving signal receiving location corresponding to the group number. A time period and a statistics manner for the terminal device to count a paging frequency are the same as those for the network device to count a paging frequency. For example, both the terminal device and the network device may count an average quantity of times that the terminal device is paged per hour on the first day of a current month. For example, a paging frequency of the terminal device UE_1 may be 3 times/hour. It is assumed that when a grouping rule received by the UE_1 is shown in Table 16, and the power saving signal receiving location information of each group of terminal devices received by the UE_1 is shown in Table 17, a group number corresponding to a paging frequency range 0-10 times/hour to which the paging frequency 3 times/hour of the UE_1 belongs is 0, so that it can be determined that the group number of the UE_1 is 0. Then, it may be determined, based on Table 17, that power saving signal receiving location information corresponding to the UE_1 is to receive a power saving signal at the location of 50 ms ahead of the first PO. The foregoing example is merely used to explain this application and shall not be construed as a limitation.

In Embodiment 3 of this application, because a probability that terminal devices whose paging frequencies are the same or similar are simultaneously paged is relatively high, terminal devices associated with a same PO are grouped based on a paging frequency, so that a false alarm rate of a terminal device can be reduced, thereby reducing power consumption of the terminal device.

Embodiment 4

In this embodiment, a grouping rule may be a mapping relationship between a group number and a terminal device category set. A terminal device category may be determined based on a terminal device feature. The terminal device feature may include at least one of the following: a peak rate, a buffer size, and mobility.

In Embodiment 4, if the grouping rule is the mapping relationship between a group number and a terminal device category set, a specific procedure in which a network device groups, once, terminal devices associated with a first PO and the terminal device determines a group number is as follows:

1. The network device groups, according to a grouping rule, terminal devices associated with a same PO.

The network device may obtain a quantity of groups for each time of grouping, and delimit a plurality of terminal device category sets based on the quantity of groups. In an embodiment, the network device may delimit at least one terminal device category set, where a quantity of groups for each time of grouping is the same as a quantity of terminal device category sets. The network device may determine terminal device categories of each group of terminal devices by using terminal device features of each group of terminal devices. The terminal device feature includes at least one of the following: a peak rate, a buffer size, and mobility.

For example, it is assumed that the network device needs to group the terminal devices associated with the first PO into two groups, and the network device may delimit two terminal device category sets: a terminal device category set A and a terminal device category set B. The terminal device category set A may include terminal device categories such as a handheld terminal, a subscriber unit, a cellular phone, and a smartphone. The terminal device category set B may be terminal device categories such as a machine type communication (MTC) device and a personal digital assistant (PDA) computer. In an embodiment, the network device delimits two groups of terminal device categories based on terminal device categories of the terminal devices associated with the first PO. For example, the terminal devices associated with the first PO may include UE_1, UE_2, UE_3, UE_4, UE_5, UE_6, UE_7, and UE_8. Terminal device categories of the eight terminal devices may be shown in Table 21.

TABLE 21

| Terminal device | Terminal device category |
|---|---|
| UE_1 | MTC |
| UE_2 | MTC |
| UE_3 | MTC |
| UE_4 | MTC |
| UE_5 | Smartphone |
| UE_6 | Smartphone |
| UE_7 | Smartphone |
| UE_8 | Smartphone |

It can be learned from Table 21 that terminal device categories of the terminal devices UE_1, UE_2, UE_3, and UE_4 are machine type communication MTC, and terminal device categories of the terminal devices UE_5, UE_6, UE_7, and UE_8 are smartphones. The example shown in Table 21 is merely used to explain this application and shall not be construed as a limitation.

The network device may delimit two terminal device category sets: a terminal device category set A and a terminal device category set B based on Table 21. The terminal device category set A includes MTC, and the terminal device category set B includes a smartphone. The mapping relationship between a group number and a terminal device category set may be shown in Table 22.

TABLE 22

| Group number | Terminal device category set |
|---|---|
| 0 | Terminal device category set A (MTC) |
| 1 | Terminal device category set B (smartphone) |

It can be learned from Table 21 and Table 22 that a group number of the terminal devices UE_1, UE_2, UE_3, and UE_4 may be 0, and a group number of the terminal devices UE_5, UE_6, UE_7, and UE_8 may be 1. The example shown in Table 22 is merely used to explain this application and shall not be construed as a limitation.

2. The network device configures corresponding power signal receiving location information for each group of terminal devices.

Power saving signal receiving location information of different groups of terminal devices may be distinguished by using at least one of time domain, frequency domain, and code domain. When only time domain is used for differentiation, power saving signal receiving locations of each group of terminal devices may be distinguished by using only a timing advance relative to the first PO. When only frequency domain is used for differentiation, the network device may send power saving signals for different groups of terminal devices on different frequency bands in a fixed time period ahead of the first PO. When only code domain is used for differentiation, sequences of power saving signals of different groups of terminal devices are different, or the network device uses different scrambling codes when sending power saving signals for different groups of terminal devices.

The following uses two groups of terminal devices as an example to describe how the network device configures power saving signal receiving location information for each group of terminal devices.

When only time domain is used for differentiation, a correspondence between a group number and power saving signal receiving location information that are of each group of terminal devices may be shown in Table 23.

TABLE 23

| Group number | Power saving signal receiving location information |
| --- | --- |
| 0 | Location of 50 ms ahead of the first PO |
| 1 | Location of 53 ms ahead of the first PO |

It can be learned from Table 23 that the power saving signal receiving location information corresponding to the group 0 of terminal devices is the location of 50 ms ahead of the first PO. The power saving signal receiving location information corresponding to the group 1 of terminal devices is the location of 53 ms ahead of the first PO. The example shown in Table 23 is merely used to explain this application and shall not be construed as a limitation.

When only frequency domain is used for differentiation, a correspondence between a group number and power saving signal receiving location information that are of each group of terminal devices may be shown in Table 24.

TABLE 24

| Group number | Power saving signal receiving location information |
| --- | --- |
| 0 | Frequency band of 2111.1 MHz to 2111.2 MHz used for a power saving signal |
| 1 | Frequency band of 2111.2 MHz to 2111.3 MHz used for a power saving signal |

It can be learned from Table 24 that the power saving signal receiving location information corresponding to the group 0 of terminal devices is the frequency band of 2111.1 MHz to 2111.2 MHz used for a power saving signal. The power saving signal receiving location information corresponding to the group 1 of terminal devices is the frequency band of 2111.2 MHz to 2111.3 MHz used for a power saving signal. The example shown in Table 24 is merely used to explain this application and shall not be construed as a limitation.

When only code domain is used for differentiation, a correspondence between a group number and power saving signal receiving location information that are of each group of terminal devices may be shown in Table 25.

TABLE 25

| Group number | Power saving signal receiving location information |
| --- | --- |
| 0 | Use a scrambling code 1 |
| 1 | Use a scrambling code 2 |

It can be learned from Table 25 that the power saving signal receiving location information corresponding to the group 0 of terminal devices is to use the scrambling code 1. The power saving signal receiving location information corresponding to the group 1 of terminal devices is to use the scrambling code 2. The example shown in Table 25 is merely used to explain this application and shall not be construed as a limitation.

The power saving signal receiving location information may be alternatively distinguished by using two or more of time domain, frequency domain, or code domain. For example, when time domain and frequency domain are used for differentiation, a correspondence between a group number and power saving signal receiving location information that are of each group of terminal devices may be shown in Table 26.

TABLE 26

| Group number | Power saving signal receiving location information |
| --- | --- |
| 0 | Location of 50 ms ahead of the first PO Frequency band of 2111.1 MHz to 2111.2 MHz used for a power saving signal |
| 1 | Location of 53 ms ahead of the first PO Frequency band of 2111.2 MHz to 2111.3 MHz used for a power saving signal |

It can be learned from Table 26 that the power saving signal receiving location information corresponding to the group 0 of terminal devices is the location of 50 ms ahead of the first PO and the frequency band of 2111.1 MHz to 2111.2 MHz used for a power saving signal. The power saving signal receiving location information corresponding to the group 1 of terminal devices is the location of 53 ms ahead of the first PO and the frequency band of 2111.2 MHz to 2111.3 MHz used for a power saving signal. The example shown in Table 26 is merely used to explain this application and shall not be construed as a limitation.

3. The network device notifies the terminal device of the grouping rule and the power signal receiving location information of each group of terminal devices.

The network device may notify, by using system information, all terminal devices associated with the first PO of the grouping rule and the power saving signal receiving location information of each group of terminal devices. A power saving signal may include a wake-up signal or a go-to-sleep signal.

The terminal device may receive, by using the system information, the grouping rule and the power saving signal receiving location information of each group of terminal devices that are notified by the network device.

4. The terminal device determines, based on a terminal device category of the terminal device, a group number corresponding to the terminal device and power saving signal receiving location information corresponding to the group number.

After receiving the grouping rule and the power saving signal receiving location information corresponding to each group of terminal devices that are sent by the network device, the terminal device determines, based on the terminal device category of the terminal device, the group number corresponding to the terminal device and a power saving signal receiving location corresponding to the group number. For example, a terminal device category of the terminal device UE_1 is MTC. It is assumed that when a grouping rule received by the UE_1 is shown in Table 22, and the power saving signal receiving location information of each group of terminal devices received by the UE_1 is shown in Table 23, a group number corresponding to the terminal device category MTC of the UE_1 is 0, so that it can be determined that the group number of the UE_1 is 0. Then, it may be determined, based on Table 23, that power saving signal receiving location information corresponding to the UE_1 is to receive a power saving signal at the location of 50 ms ahead of the first PO. The foregoing example is merely used to explain this application and shall not be construed as a limitation.

In Embodiment 4 of this application, because a probability that paging frequencies of terminal devices of a same category are similar is relatively high, and a probability that the terminal devices of the same category are simultaneously paged is also relatively high, terminal devices associated with a same PO are grouped based on terminal device categories, so that a false alarm rate of a terminal device can be reduced, thereby reducing power consumption of the terminal device.

Embodiment 5

In this embodiment, a grouping rule may be a mapping relationship between a group number and a channel condition range. A group number of each group of terminal devices may correspond to one channel condition range. Terminal devices that have different channel conditions actually require different power saving signal transmission duration.

In Embodiment 5, if the grouping rule is the mapping relationship between a group number and a channel condition range, a specific procedure in which a network device groups, once, terminal devices associated with a first PO and the terminal device determines a group number is as follows:

1. The network device groups, according to a grouping rule, terminal devices associated with a same PO.

The network device may obtain a quantity of groups for each time of grouping, and delimit a plurality of channel condition ranges based on the quantity of groups. In an embodiment, the network device may delimit at least one channel condition range, where a quantity of groups for each time of grouping is the same as a quantity of the at least one channel condition range. The network device may collect channel condition information of all terminal devices associated with the first PO.

In an embodiment, the channel condition information may include reference signal received power (RSRP), reference signal received quality (RSRQ), and a signal to interference plus noise ratio (SINR). In an embodiment, a channel condition may be alternatively measured by using another indicator. This is not limited herein.

For example, it is assumed that the network device needs to group the terminal devices associated with the first PO into two groups, and the network device may delimit two channel condition ranges: a channel condition range A and a channel condition range B. The channel condition range A may include a channel condition_1, a channel condition_2, and a channel condition_3. The channel condition range B may include a channel condition_4, a channel condition_5, and a channel condition_6. In an embodiment, the network device delimits two channel condition ranges based on the channel condition information of the terminal device associated with the first PO. For example, the terminal devices associated with the first PO may include UE_1, UE_2, UE_3, UE_4, UE_5, UE_6, UE_7, and UE_8. Channel conditions of the eight terminal devices may be shown in Table 27.

TABLE 27

| Terminal device | Channel condition |
|---|---|
| UE_1 | Channel condition_1 |
| UE_2 | Channel condition_1 |
| UE_3 | Channel condition_1 |
| UE_4 | Channel condition_1 |
| UE_5 | Channel condition_4 |
| UE_6 | Channel condition_4 |
| UE_7 | Channel condition_4 |
| UE_8 | Channel condition_4 |

It can be learned from Table 27 that channel conditions of the terminal devices UE_1, UE_2, UE_3, and UE_4 are the channel condition_1, and channel conditions of the terminal devices UE_5, UE_6, UE_7, and UE_8 are the channel condition_4. The example shown in Table 27 is merely used to explain this application and shall not be construed as a limitation.

The network device may delimit two terminal device category sets: a channel condition range A and a channel condition range B based on Table 27. The channel condition range A includes the channel condition_1, and the channel condition range B includes the channel condition_4. The mapping relationship between a group number and a channel condition range may be shown in Table 28.

TABLE 28

| Group number | Channel condition range |
|---|---|
| 0 | Channel condition range A (channel condition_1) |
| 1 | Channel condition range B (channel condition_4) |

It can be learned from Table 27 and Table 28 that a group number of the terminal devices UE_1, UE_2, UE_3, and UE_4 is 0, and a group number of the terminal devices UE_5, UE_6, UE_7, and UE_8 is 1. The example shown in Table 28 is merely used to explain this application and shall not be construed as a limitation.

2. The network device configures corresponding power signal receiving location information for each group of terminal devices.

Power saving signal receiving location information of different groups of terminal devices may be distinguished by using at least one of time domain, frequency domain, and code domain. When only time domain is used for differentiation, power saving signal receiving locations of each group of terminal devices may be distinguished by using only a timing advance relative to the first PO. When only frequency domain is used for differentiation, the network device may send power saving signals for different groups of terminal devices on different frequency bands in a fixed time period ahead of the first PO. When only code domain is used for differentiation, sequences of power saving signals of different groups of terminal devices are different, or the network device uses different scrambling codes when sending power saving signals for different groups of terminal devices.

The following uses two groups of terminal devices as an example to describe how the network device configures power saving signal receiving location information for each group of terminal devices.

When only time domain is used for differentiation, a correspondence between a group number and power saving signal receiving location information that are of each group of terminal devices may be shown in Table 29.

TABLE 29

| Group number | Power saving signal receiving location information |
|---|---|
| 0 | Location of 50 ms ahead of the first PO |
| 1 | Location of 53 ms ahead of the first PO |

It can be learned from Table 29 that the power saving signal receiving location information corresponding to the group 0 of terminal devices is the location of 50 ms ahead of the first PO. The power saving signal receiving location information corresponding to the group 1 of terminal devices is the location of 53 ms ahead of the first PO. The example shown in Table 29 is merely used to explain this application and shall not be construed as a limitation.

When only frequency domain is used for differentiation, a correspondence between a group number and power saving signal receiving location information that are of each group of terminal devices may be shown in Table 30.

TABLE 30

| Group number | Power saving signal receiving location information |
|---|---|
| 0 | Frequency band of 2111.1 MHz to 2111.2 MHz used for a power saving signal |
| 1 | Frequency band of 2111.2 MHz to 2111.3 MHz used for a power saving signal |

It can be learned from Table 30 that the power saving signal receiving location information corresponding to the group 0 of terminal devices is the frequency band of 2111.1 MHz to 2111.2 MHz used for a power saving signal. The power saving signal receiving location information corresponding to the group 1 of terminal devices is the frequency band of 2111.2 MHz to 2111.3 MHz used for a power saving signal. The example shown in Table 30 is merely used to explain this application and shall not be construed as a limitation.

When only code domain is used for differentiation, a correspondence between a group number and power saving signal receiving location information that are of each group of terminal devices may be shown in Table 31.

TABLE 31

| Group number | Power saving signal receiving location information |
|---|---|
| 0 | Use a scrambling code 1 |
| 1 | Use a scrambling code 2 |

It can be learned from Table 31 that the power saving signal receiving location information corresponding to the group 0 of terminal devices may be to use the scrambling code 1. The power saving signal receiving location information corresponding to the group 1 of terminal devices may be to use the scrambling code 2. The example shown in Table 31 is merely used to explain this application and shall not be construed as a limitation.

The power saving signal receiving location information may be alternatively distinguished by using two or more of time domain, frequency domain, or code domain. For example, when time domain and frequency domain are used for differentiation, a correspondence between a group number and power saving signal receiving location information that are of each group of terminal devices may be shown in Table 32.

TABLE 32

| Group number | Power saving signal receiving location information |
|---|---|
| 0 | Location of 50 ms ahead of the first PO Frequency band of 2111.1 MHz to 2111.2 MHz used for a power saving signal |
| 1 | Location of 53 ms ahead of the first PO Frequency band of 2111.2 MHz to 2111.3 MHz used for a power saving signal |

It can be learned from Table 32 that the power saving signal receiving location information corresponding to the group 0 of terminal devices is the location of 50 ms ahead of the first PO and the frequency band of 2111.1 MHz to 2111.2 MHz used for a power saving signal. The power saving signal receiving location information corresponding to the group 1 of terminal devices is the location of 53 ms ahead of the first PO and the frequency band of 2111.2 MHz to 2111.3 MHz used for a power saving signal. The example shown in Table 32 is merely used to explain this application and shall not be construed as a limitation.

3. The network device notifies the terminal device of the grouping rule and the power signal receiving location information of each group of terminal devices.

The network device may notify, by using system information, all terminal devices associated with the first PO of the grouping rule and the power saving signal receiving location information of each group of terminal devices. A power saving signal may include a wake-up signal or a go-to-sleep signal.

The terminal device may receive, by using the system information, the grouping rule and the power saving signal receiving location information of each group of terminal devices that are notified by the network device.

4. The terminal device determines, based on a channel condition of the terminal device, a group number corresponding to the terminal device and power saving signal receiving location information corresponding to the group number.

After receiving the grouping rule and the power saving signal receiving location information corresponding to each group of terminal devices that are sent by the network device, the terminal device determines, based on the channel condition of the terminal device, the group number corresponding to the terminal device and a power saving signal receiving location corresponding to the group number. For example, a channel condition of the terminal device UE_1 is the channel condition_1. It is assumed that when a grouping rule received by the UE_1 is shown in Table 28, and the power saving signal receiving location information of each group of terminal devices received by the UE_1 is shown in Table 29, a group number corresponding to the channel condition_1 of the UE_1 is 0, so that it can be determined that the group number of the UE_1 is 0. Then, it may be determined, based on Table 23, that power saving signal receiving location information corresponding to the UE_1 is to receive a power saving signal at the location of 50 ms ahead of the first PO. The foregoing example is merely used to explain this application and shall not be construed as a limitation.

In Embodiment 5 of this application, because average power signal transmission duration required by those terminal devices whose channel conditions are the same or similar to successfully decode a power saving signal is relatively close, terminal devices whose channel conditions are the same are grouped into one group, so that overheads of network signaling can be reduced, a gap difference between a moment at which each group of terminal devices receive a power saving signal and a corresponding PDCCH monitoring moment is reduced, and impact on network scheduling efficiency is reduced.

The following describes in detail, by using Embodiment 6 to Embodiment 9, how to perform two times of grouping for different grouping rules when the network device groups, a plurality of times (for example, twice) according to the grouping rule, the terminal devices associated with the first paging occasion PO. When the network device performs, according to the grouping rule, two times of grouping on the terminal devices associated with the first PO, the grouping rule may include any two sets of mapping relationships in Embodiment 1 to Embodiment 5. The network device may group, for the first time according to the grouping rule, the terminal devices associated with the first PO, to obtain M groups of terminal devices, and then group each of the M groups of terminal devices for the second time according to the grouping rule, to obtain T groups of terminal devices, where M is greater than or equal to 1, T is greater than or equal to 2, and a mapping relationship included in the grouping rule used for the first time of grouping is different from a mapping relationship included in the grouping rule used for the second time of grouping.

Embodiment 6

In this embodiment, a mapping relationship between a group number and a DRX cycle may be used during the first time of grouping according to a grouping rule, and a mapping relationship between a group number and one or more of the following parameters: a terminal device identifier, a quantity of groups, a quantity N of paging frames PFs in each DRX cycle, a quantity Ns of POs in each PF, and a weight of each group of terminal devices may be used during the second time of grouping. Alternatively, a mapping relationship between a group number and one or more of the following parameters: a terminal device identifier, a quantity of groups, a quantity N of paging frames PFs in each DRX cycle, a quantity Ns of POs in each PF, and each group of terminal devices may be used during the first time of grouping, and a mapping relationship between a group number and a DRX cycle may be used during the second time of grouping. This shall not be construed as a limitation.

In Embodiment 6, a specific procedure of performing two times of grouping by a network device is described by using an example in which the mapping relationship between a group number and a DRX cycle is used for the first time of grouping, and the mapping relationship between a group number and one or more of the following parameters: a terminal device identifier, a quantity of groups, a quantity N of paging frames PFs in each DRX cycle, a quantity Ns of POs in each PF, and a weight of each group of terminal devices is used for the second time of grouping. The specific procedure of the two times of grouping may be as follows:

1. The network device groups, for the first time, terminal devices associated with a first PO, to obtain M groups of terminal devices.

The network device groups, for the first time based on the mapping relationship between a group number and a DRX cycle, the terminal devices associated with the first PO.

For example, it is assumed that the terminal devices associated with the first PO may include UE_1, UE_2, UE_3, UE_4, UE_5, UE_6, UE_7, and UE_8. DRX cycle values of the eight terminal devices may be shown in Table 33.

TABLE 33

| Terminal device | DRX cycle |
|---|---|
| UE_1 | 320 ms |
| UE_2 | 640 ms |
| UE_3 | 1280 ms |
| UE_4 | 2560 ms |
| UE_5 | 320 ms |
| UE_6 | 640 ms |
| UE_7 | 1280 ms |
| UE_8 | 2560 ms |

As shown in Table 33, DRX cycle values of the UE_1 and the UE_5 are 320 ms, DRX cycle values of the UE_2 and the UE_6 are 640 m, DRX cycle values of the UE_3 and the UE_7 are 1280 ms, and DRX cycle values of the UE_4 and the UE_8 are 2560 ms. The example shown in Table 33 is merely used to explain this application and shall not be construed as a limitation.

The network device may group terminal devices whose DRX cycle value set is 320 ms and 640 ms into one group, that is, the network device groups the terminal devices UE_1, UE_2, UE_5, and UE_6 into one group, and the network device may group terminal devices whose DRX cycle value set is 1280 ms and 2560 ms into one group, that is, the network device groups the terminal devices UE_3, UE_4, UE_7, and UE_8 into one group. Therefore, the network device groups, into two groups by using the DRX cycle values of the terminal devices, the eight terminal devices UE_1, UE_2, UE_3, UE_4, UE_5, UE_6, UE_7, and UE_8 that are associated with the first PO. A mapping relationship between a group number for the first time of grouping of the two groups of terminal devices and a DRX cycle may be shown in Table 34.

TABLE 34

| Group number for the first time of grouping | DRX cycle |
|---|---|
| 0 | 320 ms and 640 ms |
| 1 | 1280 ms and 2560 ms |

It can be learned from Table 33 and Table 34 that, a group number of the terminal devices UE_1, UE_2, UE_5, and UE_6 for the first time of grouping is 0, and a group number of the terminal devices UE_3, UE_4, UE_7, and UE_8 for the first time of grouping is 1. The example shown in Table 34 is merely used to explain this application and shall not be construed as a limitation.

2. The network device groups each of the M groups of terminal devices for the second time, to obtain T groups of terminal devices.

The network device groups, for the second time based on the mapping relationship between a group number and one or more of the following parameters: a terminal device identifier, a quantity of groups, a quantity of paging frames PFs in each DRX cycle, a quantity of POs in each PF, and a weight of each group of terminal devices, each of the two groups of terminal devices obtained through the first time of grouping, to obtain four groups of terminal devices in total through the two times of grouping. A group number for the second time of grouping may be a minimum index value n that meets the following formula (3):

floor(UE_ID/(N*Ns))mod g<g(0)+g(1)+ . . . +g(n)　　Formula (3)

In the foregoing formula (3), UE_ID is the terminal device identifier, g(n) is a weight of a user group whose group number is n, g(n) is an integer, and g(0)+g(1)+ . . . +g(R−1)=g, where R is a quantity of groups for the second time of grouping, a value range of the minimum index value n is 0≤n≤R−1, N is the quantity of paging frames PFs in each DRX cycle, and Ns is the quantity of POs in each PF.

The network device may subdivide each of two groups of terminal devices obtained through the first time of grouping into two groups of terminal devices, to finally obtain four groups of terminal devices. Group numbers of the four groups of terminal devices may be 0-0, 0-1, 1-0, and 1-1. The group number 0-0 may indicate that a group number of a terminal device for the first time of grouping is 0, and a group number for the second time of grouping is 0. The group number 0-1 may indicate that a group number of a terminal device for the first time of grouping is 0, and a group number for the second time of grouping is 1. The group number 1-0 may indicate that a group number of a terminal device for the first time of grouping is 1, and a group number for the second time of grouping is 0. The group number 1-1 may indicate that a group number of a terminal device for the first time of grouping is 1, and a group number for the second time of grouping is 1.

Terminal device identifiers UE_IDs of the eight terminal devices, the quantity N of paging frames PFs in each DRX cycle, and the quantity Ns of POs in each PF may be shown in Table 35.

TABLE 35

| Terminal device | UE_ID (IMSI mod 1024) | N | Ns |
|---|---|---|---|
| UE_1 | 193 | 32 | 2 |
| UE_2 | 385 | 32 | 2 |
| UE_3 | 195 | 32 | 2 |
| UE_4 | 579 | 32 | 2 |
| UE_5 | 258 | 32 | 2 |
| UE_6 | 450 | 32 | 2 |
| UE_7 | 330 | 32 | 2 |
| UE_8 | 720 | 32 | 2 |

In the two groups of terminal devices whose group numbers are 0 and 1 for the first time of grouping, weight values corresponding to group numbers for the second time of grouping may be shown in Table 36.

TABLE 36

| Group number (n) | Weight value (g(n)) |
|---|---|
| 0 | 1 |
| 1 | 2 |

It can be learned from Table 36 that weight values g(0) and g(1) of the two groups for the second time of grouping are 1 and 2. The example shown in Table 36 is merely used to explain this application and shall not be construed as a limitation.

A group number of each terminal device for the second time of grouping may be calculated by using Table 35 and Table 36 according to the foregoing formula (3). The group number of each terminal device for the second time of grouping may be shown in Table 37.

TABLE 37

| Terminal device | Group number for the second time of grouping |
|---|---|
| UE_1 | 0 |
| UE_2 | 0 |
| UE_3 | 0 |
| UE_4 | 0 |
| UE_5 | 1 |
| UE_6 | 1 |
| UE_7 | 1 |
| UE_8 | 1 |

With reference to Table 34 and Table 37, grouping numbers of the eight terminal devices after the two times of grouping may be shown in Table 38.

TABLE 38

| Terminal device | Group number for two times of grouping |
|---|---|
| UE_1 | 0-0 |
| UE_2 | 0-0 |

TABLE 38-continued

| Terminal device | Group number for two times of grouping |
|---|---|
| UE_3 | 1-0 |
| UE_4 | 1-0 |
| UE_5 | 0-1 |
| UE_6 | 0-1 |
| UE_7 | 1-1 |
| UE_8 | 1-1 |

It can be learned from Table 38 that, a group number of the terminal devices UE_1 and UE_2 for the two times of grouping may be 0-0, that is, a group number of the UE_1 and the UE_2 for the first time of grouping is 0, and a group number for the second time of grouping is 0. A group number of the terminal devices UE_3 and UE_4 for the two times of grouping may be 1-0, that is, a group number of the UE_3 and the UE_4 for the first time of grouping is 1, and a group number for the second time of grouping is 0. A group number of the terminal devices UE_5 and UE_6 for the two times of grouping may be 0-1, that is, a group number of the UE_5 and the UE_6 for the first time of grouping is 0, and a group number for the second time of grouping is 1. A group number of the terminal devices UE_7 and UE_8 for the two times of grouping may be 1-1, that is, a group number of the UE_7 and the UE_8 for the first time of grouping is 1, and a group number for the second time of grouping is 1. The example shown in Table 38 is merely used to explain this application and shall not be construed as a limitation.

In Embodiment 6 of this application, terminal devices whose DRX cycles are the same or similar are first grouped into a same group, and then are further grouped by using the foregoing formula (3), so that a probability that each group of terminal devices are simultaneously paged is increased, or in other words, a false alarm probability is reduced, thereby reducing total power consumption of terminal devices associated with a same PO. In addition, a requirement for a larger quantity of groups can be met.

Embodiment 7

In this embodiment, a mapping relationship between a group number and a DRX cycle may be used during the first time of grouping according to a grouping rule, and a mapping relationship between a group number and a paging frequency range may be used during the second time of grouping. Alternatively, a mapping relationship between a group number and a paging frequency range may be used during the first time of grouping in two times of grouping, and a mapping relationship between a group number and a DRX cycle may be used during the second time of grouping. This shall not be construed as a limitation.

In Embodiment 7, a specific procedure of performing two times of grouping by a network device is described by using an example in which the grouping rule is that the mapping relationship between a group number and a DRX cycle is used for the first time of grouping, and the mapping relationship between a group number and a paging frequency range is used for the second time of grouping. The specific procedure of the two times of grouping may be as follows:

1. The network device groups, for the first time, terminal devices associated with a first PO, to obtain M groups of terminal devices.

The network device groups, for the first time based on the mapping relationship between a group number and a DRX cycle, the terminal devices associated with the first PO.

For example, it is assumed that the terminal devices associated with the first PO may include UE_1, UE_2, UE_3, UE_4, UE_5, UE_6, UE_7, and UE_8. DRX cycle values of the eight terminal devices may be shown in Table 39.

TABLE 39

| Terminal device | DRX cycle |
|---|---|
| UE_1 | 320 ms |
| UE_2 | 640 ms |
| UE_3 | 1280 ms |
| UE_4 | 2560 ms |
| UE_5 | 320 ms |
| UE_6 | 640 ms |
| UE_7 | 1280 ms |
| UE_8 | 2560 ms |

As shown in Table 39, DRX cycle values of the UE_1 and the UE_5 are 320 ms, DRX cycle values of the UE_2 and the UE_6 are 640 m, DRX cycle values of the UE_3 and the UE_7 are 1280 ms, and DRX cycle values of the UE_4 and the UE_8 are 2560 ms. The example shown in Table 39 is merely used to explain this application and shall not be construed as a limitation.

The network device may group terminal devices whose DRX cycle value set is 320 ms and 640 ms into one group, that is, the network device groups the terminal devices UE_1, UE_2, UE_5, and UE_6 into one group, and the network device may group terminal devices whose DRX cycle value set is 1280 ms and 2560 ms into one group, that is, the network device groups the terminal devices UE_3, UE_4, UE_7, and UE_8 into one group. Therefore, the network device groups, into two groups by using the DRX cycle values of the terminal devices, the eight terminal devices UE_1, UE_2, UE_3, UE_4, UE_5, UE_6, UE_7, and UE_8 that are associated with the first PO. A mapping relationship between a group number for the first time of grouping of the two groups of terminal devices and a DRX cycle may be shown in Table 40.

TABLE 40

| Group number for the first time of grouping | DRX cycle |
|---|---|
| 0 | 320 ms and 640 ms |
| 1 | 1280 ms and 2560 ms |

It can be learned from Table 39 and Table 40 that, a group number of the terminal devices UE_1, UE_2, UE_5, and UE_6 for the first time of grouping is 0, and a group number of the terminal devices UE_3, UE_4, UE_7, and UE_8 for the first time of grouping is 1. The example shown in Table 34 is merely used to explain this application and shall not be construed as a limitation.

2. The network device groups each of the M groups of terminal devices for the second time, to obtain T groups of terminal devices.

The network device groups, for the second time based on the mapping relationship between a group number and a paging frequency range, each of the two groups of terminal devices obtained through the first time of grouping, to obtain four groups of terminal devices in total through the two times of grouping.

The network device may subdivide each of two groups of terminal devices obtained through the first time of grouping into two groups of terminal devices, to finally obtain four groups of terminal devices. Group numbers of the four groups of terminal devices may be 0-0, 0-1, 1-0, and 1-1. The group number 0-0 may indicate that a group number of a terminal device for the first time of grouping is 0, and a group number for the second time of grouping is 0. The group number 0-1 may indicate that a group number of a terminal device for the first time of grouping is 0, and a group number for the second time of grouping is 1. The group number 1-0 may indicate that a group number of a terminal device for the first time of grouping is 1, and a group number for the second time of grouping is 0. The group number 1-1 may indicate that a group number of a terminal device for the first time of grouping is 1, and a group number for the second time of grouping is 1.

Paging frequencies of the eight terminal devices may be shown in Table 41.

TABLE 41

| Terminal device | Paging frequency (times/hour) |
|---|---|
| UE_1 | 3 |
| UE_2 | 14 |
| UE_3 | 8 |
| UE_4 | 15 |
| UE_5 | 27 |
| UE_6 | 36 |
| UE_7 | 28 |
| UE_8 | 39 |

A mapping relationship between a group number for the second time of grouping and a paging frequency range may be shown in Table 42.

TABLE 42

| Group number | Paging frequency range (times/hour) |
|---|---|
| 0 | 0-20 |
| 1 | 21-40 |

It can be learned from Table 41 and Table 42 that, a group number of the terminal devices UE_1, UE_2, UE_3, and UE_4 during the second time of grouping is 0, and a group number of the terminal devices UE_5, UE_6, UE_7, and UE_8 during the second time of grouping is 1. The example shown in Table 41 and Table 42 is merely used to explain this application and shall not be construed as a limitation.

Group numbers of the eight terminal devices after the two times of grouping may be shown in Table 43.

TABLE 43

| Terminal device | Group number for two times of grouping |
|---|---|
| UE_1 | 0-0 |
| UE_2 | 0-0 |
| UE_3 | 1-0 |
| UE_4 | 1-0 |
| UE_5 | 0-1 |
| UE_6 | 0-1 |
| UE_7 | 1-1 |
| UE_8 | 1-1 |

It can be learned from Table 43 that, a group number of the terminal devices UE_1 and UE_2 for the two times of grouping is 0-0, that is, a group number of the UE_1 and the UE_2 for the first time of grouping is 0, and a group number for the second time of grouping is 0. A group number of the terminal devices UE_3 and UE_4 for the two times of grouping is 1-0, that is, a group number of the UE_3 and the UE_4 for the first time of grouping is 1, and a group number for the second time of grouping is 0. A group number of the terminal devices UE_5 and UE_6 for the two times of grouping is 0-1, that is, a group number of the UE_5 and the UE_6 for the first time of grouping is 0, and a group number for the second time of grouping is 1. A group number of the terminal devices UE_7 and UE_8 for the two times of grouping is 1-1, that is, a group number of the UE_7 and the UE_8 for the first time of grouping is 1, and a group number for the second time of grouping is 1. The example shown in Table 43 is merely used to explain this application and shall not be construed as a limitation.

In Embodiment 7 of this application, terminal devices whose DRX cycles are the same or similar are first grouped into a same group, and then are further grouped by using paging frequencies, so that a probability that each group of terminal devices are simultaneously paged is increased, or in other words, a false alarm probability is reduced, thereby reducing total power consumption of terminal devices associated with a same PO. In addition, a requirement for a larger quantity of groups can be met.

Embodiment 8

In this embodiment, a mapping relationship between a group number and a DRX cycle may be used during the first time of grouping according to a grouping rule, and a mapping relationship between a group number and a terminal device category set may be used during the second time of grouping. Alternatively, a mapping relationship between a group number and a terminal device category set may be used during the first time of grouping, and a mapping relationship between a group number and a DRX cycle may be used during the second time of grouping. This shall not be construed as a limitation.

In Embodiment 8, a specific procedure of performing two times of grouping by a network device is described by using an example in which the grouping rule is that the mapping relationship between a group number and a DRX cycle is used for the first time of grouping, and the mapping relationship between a group number and a terminal device category set is used for the second time of grouping. The specific procedure of the two times of grouping may be as follows:

1. The network device groups, for the first time, terminal devices associated with a first PO, to obtain M groups of terminal devices.

The network device groups, for the first time based on the mapping relationship between a group number and a DRX cycle, the terminal devices associated with the first PO.

For example, it is assumed that the terminal devices associated with the first PO may include UE_1, UE_2, UE_3, UE_4, UE_5, UE_6, UE_7, and UE_8. DRX cycle values of the eight terminal devices may be shown in Table 44.

TABLE 44

| Terminal device | DRX cycle |
|---|---|
| UE_1 | 320 ms |
| UE_2 | 640 ms |
| UE_3 | 1280 ms |
| UE_4 | 2560 ms |
| UE_5 | 320 ms |
| UE_6 | 640 ms |
| UE_7 | 1280 ms |
| UE_8 | 2560 ms |

As shown in Table 44, DRX cycle values of the UE_1 and the UE_5 may be 320 ms, DRX cycle values of the UE_2 and the UE_6 may be 640 m, DRX cycle values of the UE_3 and the UE_7 may be 1280 ms, and DRX cycle values of the UE_4 and the UE_8 may be 2560 ms. The example shown in Table 44 is merely used to explain this application and shall not be construed as a limitation.

The network device may group terminal devices whose DRX cycle value set is 320 ms and 640 ms into one group, that is, the network device groups the terminal devices UE_1, UE_2, UE_5, and UE_6 into one group, and the network device may group terminal devices whose DRX cycle value set is 1280 ms and 2560 ms into one group, that is, the network device groups the terminal devices UE_3, UE_4, UE_7, and UE_8 into one group. Therefore, the network device groups, into two groups by using the DRX cycle values of the terminal devices, the eight terminal devices UE_1, UE_2, UE_3, UE_4, UE_5, UE_6, UE_7, and UE_8 that are associated with the first PO. A mapping relationship between a group number for the first time of grouping of the two groups of terminal devices and a DRX cycle may be shown in Table 45.

TABLE 45

| Group number for the first time of grouping | DRX cycle |
|---|---|
| 0 | 320 ms and 640 ms |
| 1 | 1280 ms and 2560 ms |

It can be learned from Table 44 and Table 45 that, a group number of the terminal devices UE_1, UE_2, UE_5, and UE_6 for the first time of grouping may be 0, and a group number of the terminal devices UE_3, UE_4, UE_7, and UE_8 for the first time of grouping may be 1. The example shown in Table 45 is merely used to explain this application and shall not be construed as a limitation.

2. The network device groups each of the M groups of terminal devices for the second time, to obtain T groups of terminal devices.

The network device groups, for the second time based on the mapping relationship between a group number and a terminal device category set, each of the two groups of terminal devices obtained through the first time of grouping, to obtain four groups of terminal devices in total through the two times of grouping.

The network device may subdivide each of two groups of terminal devices obtained through the first time of grouping into two groups of terminal devices, to finally obtain four groups of terminal devices. Group numbers of the four groups of terminal devices may be 0-0, 0-1, 1-0, and 1-1. The group number 0-0 may indicate that a group number of a terminal device for the first time of grouping is 0, and a group number for the second time of grouping is 0. The group number 0-1 may indicate that a group number of a terminal device for the first time of grouping is 0, and a group number for the second time of grouping is 1. The group number 1-0 may indicate that a group number of a terminal device for the first time of grouping is 1, and a group number for the second time of grouping is 0. The group number 1-1 may indicate that a group number of a terminal device for the first time of grouping is 1, and a group number for the second time of grouping is 1.

Terminal device categories of the eight terminal devices may be shown in Table 46.

TABLE 46

| Terminal device | Terminal device category |
| --- | --- |
| UE_1 | MTC |
| UE_2 | MTC |
| UE_3 | MTC |
| UE_4 | MTC |
| UE_5 | Smartphone |
| UE_6 | Smartphone |
| UE_7 | Smartphone |
| UE_8 | Smartphone |

It can be learned from Table 46 that terminal device categories of the terminal devices UE_1, UE_2, UE_3, and UE_4 may be machine type communication MTC, and terminal device categories of the terminal devices UE_5, UE_6, UE_7, and UE_8 may be smartphones. The example shown in Table 46 is merely used to explain this application and shall not be construed as a limitation.

A mapping relationship between a group number for the second time of grouping and a terminal device category set may be shown in Table 47.

TABLE 47

| Group number | Terminal device category set |
| --- | --- |
| 0 | Terminal device category set A (MTC) |
| 1 | Terminal device category set B (smartphone) |

It can be learned from Table 46 and Table 47 that, a group number of the terminal devices UE_1, UE_2, UE_3, and UE_4 for the second time of grouping may be 0, and a group number of the terminal devices UE_5, UE_6, UE_7, and UE_8 for the second time of grouping may be 1. The example shown in Table 47 is merely used to explain this application and shall not be construed as a limitation.

Group numbers of the eight terminal devices after the two times of grouping may be shown in Table 48.

TABLE 48

| Terminal device | Group number for two times of grouping |
| --- | --- |
| UE_1 | 0-0 |
| UE_2 | 0-0 |
| UE_3 | 1-0 |
| UE_4 | 1-0 |
| UE_5 | 0-1 |
| UE_6 | 0-1 |
| UE_7 | 1-1 |
| UE_8 | 1-1 |

It can be learned from Table 48 that, a group number of the terminal devices UE_1 and UE_2 for the two times of grouping is 0-0, that is, a group number of the UE_1 and the UE_2 for the first time of grouping is 0, and a group number for the second time of grouping is 0. A group number of the terminal devices UE_3 and UE_4 for the two times of grouping is 1-0, that is, a group number of the UE_3 and the UE_4 for the first time of grouping is 1, and a group number for the second time of grouping is 0. A group number of the terminal devices UE_5 and UE_6 for the two times of grouping is 0-1, that is, a group number of the UE_5 and the UE_6 for the first time of grouping is 0, and a group number for the second time of grouping is 1. A group number of the terminal devices UE_7 and UE_8 for the two times of grouping is 1-1, that is, a group number of the UE_7 and the UE_8 for the first time of grouping is 1, and a group number for the second time of grouping is 1. The example shown in Table 48 is merely used to explain this application and shall not be construed as a limitation.

In Embodiment 8 of this application, terminal devices whose DRX cycles are the same or similar are first grouped into a same group, and then are further grouped by using terminal device categories, so that a probability that each group of terminal devices are simultaneously paged is increased, or in other words, a false alarm probability is reduced, thereby reducing total power consumption of terminal devices associated with a same PO. In addition, a requirement for a larger quantity of groups can be met.

Embodiment 9

In this embodiment, a mapping relationship between a group number and a DRX cycle may be used during the first time of grouping according to a grouping rule, and a mapping relationship between a group number and a channel condition range may be used during the second time of grouping. Alternatively, a mapping relationship between a group number and a channel condition range may be used during the first time of grouping, and a mapping relationship between a group number and a DRX cycle may be used during the second time of grouping. This shall not be construed as a limitation.

In Embodiment 9, a specific procedure of performing two times of grouping by a network device is described by using an example in which the grouping rule is that the mapping relationship between a group number and a DRX cycle is used for the first time of grouping, and the mapping relationship between a group number and a channel condition range is used for the second time of grouping. The specific procedure of the two times of grouping may be as follows:

1. The network device groups, for the first time, terminal devices associated with a first PO, to obtain M groups of terminal devices.

The network device groups, for the first time based on the mapping relationship between a group number and a DRX cycle, the terminal devices associated with the first PO.

For example, it is assumed that the terminal devices associated with the first PO may include UE_1, UE_2, UE_3, UE_4, UE_5, UE_6, UE_7, and UE_8. DRX cycle values of the eight terminal devices may be shown in Table 49.

TABLE 49

| Terminal device | DRX cycle |
| --- | --- |
| UE_1 | 320 ms |
| UE_2 | 640 ms |
| UE_3 | 1280 ms |
| UE_4 | 2560 ms |
| UE_5 | 320 ms |
| UE_6 | 640 ms |
| UE_7 | 1280 ms |
| UE_8 | 2560 ms |

As shown in Table 49, DRX cycle values of the UE_1 and the UE_5 may be 320 ms, DRX cycle values of the UE_2 and the UE_6 may be 640 m, DRX cycle values of the UE_3 and the UE_7 may be 1280 ms, and DRX cycle values of the UE_4 and the UE_8 may be 2560 ms. The example shown in Table 49 is merely used to explain this application and shall not be construed as a limitation.

The network device may group terminal devices whose DRX cycle value set is 320 ms and 640 ms into one group, that is, the network device groups the terminal devices UE_1, UE_2, UE_5, and UE_6 into one group, and the network device may group terminal devices whose DRX cycle value set is 1280 ms and 2560 ms into one group, that is, the network device groups the terminal devices UE_3, UE_4, UE_7, and UE_8 into one group. Therefore, the network device groups, into two groups by using the DRX cycle values of the terminal devices, the eight terminal devices UE_1, UE_2, UE_3, UE_4, UE_5, UE_6, UE_7, and UE_8 that are associated with the first PO. A mapping relationship between a group number for the first time of grouping of the two groups of terminal devices and a DRX cycle may be shown in Table 50.

TABLE 50

| Group number for the first time of grouping | DRX cycle |
| --- | --- |
| 0 | 320 ms and 640 ms |
| 1 | 1280 ms and 2560 ms |

It can be learned from Table 49 and Table 50 that, a group number of the terminal devices UE_1, UE_2, UE_5, and UE_6 for the first time of grouping may be 0, and a group number of the terminal devices UE_3, UE_4, UE_7, and UE_8 for the first time of grouping may be 1. The example shown in Table 50 is merely used to explain this application and shall not be construed as a limitation.

2. The network device groups each of the M groups of terminal devices for the second time, to obtain T groups of terminal devices.

The network device groups, for the second time based on the mapping relationship between a group number and a channel condition range, each of the two groups of terminal devices obtained through the first time of grouping, to obtain four groups of terminal devices in total through the two times of grouping.

In an embodiment, the channel condition information may include reference signal received power (RSRP), reference signal received quality (RSRQ), and a signal to interference plus noise ratio (SINR). In an embodiment, a channel condition may be alternatively measured by using another indicator. This is not limited herein.

The network device may subdivide each of two groups of terminal devices obtained through the first time of grouping into two groups of terminal devices, to finally obtain four groups of terminal devices. Group numbers of the four groups of terminal devices may be 0-0, 0-1, 1-0, and 1-1. The group number 0-0 may indicate that a group number of a terminal device for the first time of grouping is 0, and a group number for the second time of grouping is 0. The group number 0-1 may indicate that a group number of a terminal device for the first time of grouping is 0, and a group number for the second time of grouping is 1. The group number 1-0 may indicate that a group number of a terminal device for the first time of grouping is 1, and a group number for the second time of grouping is 0. The group number 1-1 may indicate that a group number of a terminal device for the first time of grouping is 1, and a group number for the second time of grouping is 1.

Terminal device categories of the eight terminal devices may be shown in Table 51.

TABLE 51

| Terminal device | Channel condition |
| --- | --- |
| UE_1 | Channel condition_1 |
| UE_2 | Channel condition_1 |
| UE_3 | Channel condition_1 |

TABLE 51-continued

| Terminal device | Channel condition |
| --- | --- |
| UE_4 | Channel condition_1 |
| UE_5 | Channel condition_4 |
| UE_6 | Channel condition_4 |
| UE_7 | Channel condition_4 |
| UE_8 | Channel condition_4 |

It can be learned from Table 51 that channel conditions of the terminal devices UE_1, UE_2, UE_3, and UE_4 may be the channel condition_1, and channel conditions of the terminal devices UE_5, UE_6, UE_7, and UE_8 may be the channel condition_4. The example shown in Table 51 is merely used to explain this application and shall not be construed as a limitation.

A mapping relationship between a group number for the second time of grouping and a channel condition range may be shown in Table 52.

TABLE 52

| Group number | Channel condition range |
| --- | --- |
| 0 | Channel condition range A (channel condition_1, channel condition_2, and channel condition_3) |
| 1 | Channel condition range B (channel condition_4, channel condition_5, and channel condition_6) |

It can be learned from Table 51 and Table 52 that, a group number of the terminal devices UE_1, UE_2, UE_3, and UE_4 for the second time of grouping may be 0, and a group number of the terminal devices UE_5, UE_6, UE_7, and UE_8 for the second time of grouping may be 1. The example shown in Table 52 is merely used to explain this application and shall not be construed as a limitation.

Group numbers of the eight terminal devices after the two times of grouping may be shown in Table 53.

TABLE 53

| Terminal device | Group number for two times of grouping |
| --- | --- |
| UE_1 | 0-0 |
| UE_2 | 0-0 |
| UE_3 | 1-0 |
| UE_4 | 1-0 |
| UE_5 | 0-1 |
| UE_6 | 0-1 |
| UE_7 | 1-1 |
| UE_8 | 1-1 |

It can be learned from Table 53 that, a group number of the terminal devices UE_1 and UE_2 for the two times of grouping is 0-0, that is, a group number of the UE_1 and the UE_2 for the first time of grouping is 0, and a group number for the second time of grouping is 0. A group number of the terminal devices UE_3 and UE_4 for the two times of grouping is 1-0, that is, a group number of the UE_3 and the UE_4 for the first time of grouping is 1, and a group number for the second time of grouping is 0. A group number of the terminal devices UE_5 and UE_6 for the two times of grouping is 0-1, that is, a group number of the UE_5 and the UE_6 for the first time of grouping is 0, and a group number for the second time of grouping is 1. A group number of the terminal devices UE_7 and UE_8 for the two times of grouping may be 1-1, that is, a group number of the UE_7 and the UE_8 for the first time of grouping is 1, and a group number for the second time of grouping is 1. The example shown in Table 53 is merely used to explain this application and shall not be construed as a limitation.

In Embodiment 9 of this application, terminal devices whose DRX cycles are the same or similar are first grouped into a same group, and then are further grouped by using channel conditions of the terminal devices, so that a probability that each group of terminal devices are simultaneously paged is increased, that is, total power consumption of terminal devices associated with a same PO is reduced, overheads of network signaling are reduced, and impact on network scheduling efficiency is reduced. In addition, a requirement for a larger quantity of groups can be met.

In this application, Embodiment 1 to Embodiment 5 may be implemented in combination with each other. Embodiment 6 to Embodiment 9 describe only four cases in which Embodiment 1 to Embodiment 5 are combined. For other combination embodiments, refer to the foregoing embodiments. Details are not described herein again. For a part that is not described in detail in the foregoing embodiments, refer to other embodiments.

Figure 6:
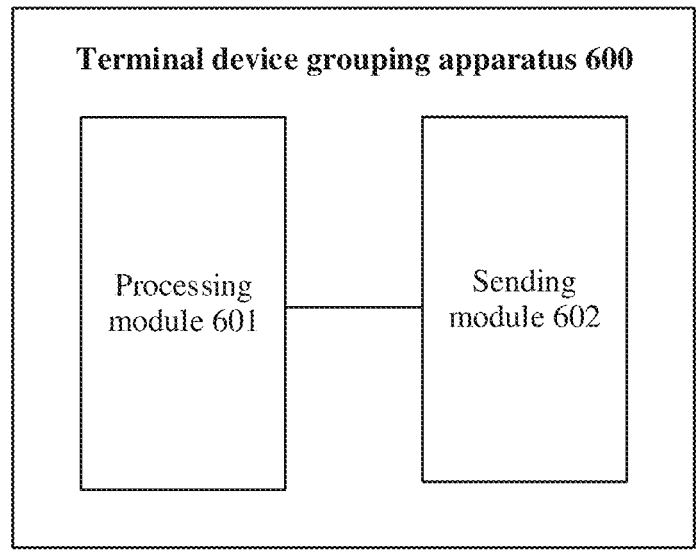
FIG. 6 is a functional block diagram of a terminal device grouping apparatus according to this application.

FIG. 6 is a schematic diagram of a terminal device grouping apparatus according to this application. As shown in FIG. 6, a terminal device grouping apparatus 600 may include a processing module 601 and a sending module 602.

The processing module 601 is configured to group, one or more times according to a grouping rule, terminal devices associated with a first paging occasion PO.

The sending module 602 is configured to notify all terminal devices associated with the first PO of the grouping rule and power saving signal receiving location information of each group of terminal devices obtained through one or more times of grouping by the processing module, where a power saving signal of each group of terminal devices includes a wake-up signal WUS or a go-to-sleep signal GTS of each group of terminal devices.

In an embodiment, the processing module 601 is specifically configured to: group, for the first time according to the grouping rule, the terminal devices associated with the first paging occasion PO, to obtain M groups of terminal devices, and then group each of the M groups of terminal devices for the second time according to the grouping rule, to obtain T groups of terminal devices, where M is greater than or equal to 1, T is greater than or equal to 2, and a mapping relationship included in the grouping rule used for the first time of grouping is different from a mapping relationship included in the grouping rule used for the second time of grouping.

The grouping rule includes: a mapping relationship between a group number and a discontinuous reception DRX cycle; or a mapping relationship between a group number and one or more of the following parameters: a terminal device identifier, a quantity of groups, a quantity of paging frames PFs in each discontinuous reception DRX cycle, a quantity of POs in each PF, and a weight of each group of terminal devices; or a mapping relationship between a group number and a paging frequency range; or a mapping relationship between a group number and a terminal device category set; or a mapping relationship between a group number and a channel condition range.

In an embodiment, when the grouping rule includes the mapping relationship between a group number and a discontinuous reception DRX cycle, each group of terminal devices obtained through one or more times of grouping corresponds to a DRX cycle value or a DRX cycle value set.

In an embodiment, when the grouping rule includes the mapping relationship between a group number and one or more of the following parameters: a terminal device identifier, a quantity of groups, a quantity of paging frames PFs in each DRX cycle, a quantity of POs in each PF, and a weight of each group of terminal devices, the group number is a minimum index value n that meets the following formula:

$$\text{floor}(\text{UE\_ID}/(N*Ns)) \bmod g < g(0)+g(1)+ \ldots +g(n)$$

UE_ID is the terminal device identifier, $g(n)$ is a weight of a user group whose group number is n, $g(n)$ is an integer, and $g(0)+g(1)+ \ldots +g(G-1)=g$, where G is the quantity of groups, a value range of the minimum index n is $0 \le n \le G-1$, N is the quantity of paging frames PFs in each DRX cycle, and Ns is the quantity of POs in each PF.

In an embodiment, the processing module 601 is further configured to: when the grouping rule includes the mapping relationship between a group number and a paging frequency range, obtain a quantity of groups, and delimit a plurality of paging frequency ranges based on the quantity of groups; or when the grouping rule includes the mapping relationship between a group number and a paging frequency range, delimit a paging frequency range, where a quantity of groups for each time of grouping is the same as a quantity of paging frequency ranges. A paging frequency is an average quantity of times that a terminal device is paged in a unit time in a statistics time period determined according to a paging frequency statistics rule. The sending module 602 is further configured to notify all the terminal devices associated with the first PO of the paging frequency statistics rule. The paging frequency statistics rule is used to determine a paging frequency statistics time period.

In an embodiment, the processing module 601 is further configured to: when the grouping rule includes the mapping relationship between a group number and one or more of the following parameters: a terminal device identifier, a quantity of groups, a quantity of paging frames PFs in each discontinuous reception DRX cycle, a quantity of POs in each PF, and a weight of each group of terminal devices, adjust a false alarm rate of each group of terminal devices by adjusting the weight of each group of terminal devices, where a false alarm rate of one group of terminals is a ratio of a quantity of times that any terminal device in the group of terminal devices is woken up but is not paged to a quantity of times that any terminal device in the group of terminal devices is woken up in a first time period.

In an embodiment, the processing module 601 is further configured to: when the grouping rule includes the mapping relationship between a group number and a terminal device category set, obtain a quantity of groups, and delimit a plurality of terminal device category sets based on the quantity of groups; or when the grouping rule includes the mapping relationship between a group number and a terminal device category set, delimit a terminal device category set, where a quantity of groups for each time of grouping is the same as a quantity of delimited terminal device category sets. The processing module 601 is further configured to determine a terminal device category of each group of terminal devices by using a terminal device feature of each group of terminal devices, where the terminal device feature includes at least one of the following: a peak rate, a buffer size, and mobility.

In an embodiment, the processing module 601 is further configured to: when the grouping rule includes the mapping relationship between a group number and a channel condition range, obtain a quantity of groups, and delimit a plurality of channel condition ranges based on the quantity of groups; or when the grouping rule includes the mapping relationship between a group number and a channel condition range, delimit a channel condition range, where a quantity of groups for each time of grouping is the same as a quantity of delimited channel condition ranges.

In an embodiment, the sending module 602 is specifically configured to notify, by using system information, all the terminal devices associated with the first PO of the grouping rule and the power saving signal receiving location information of each group of terminal devices.

In an embodiment, an entity apparatus corresponding to the processing module 601 is a processor, and an entity apparatus corresponding to the sending module 602 is a transmitter. For specific embodiments of function units included in the terminal device grouping apparatus 600, refer to the foregoing embodiments. Details are not described herein again.

Figure 7:
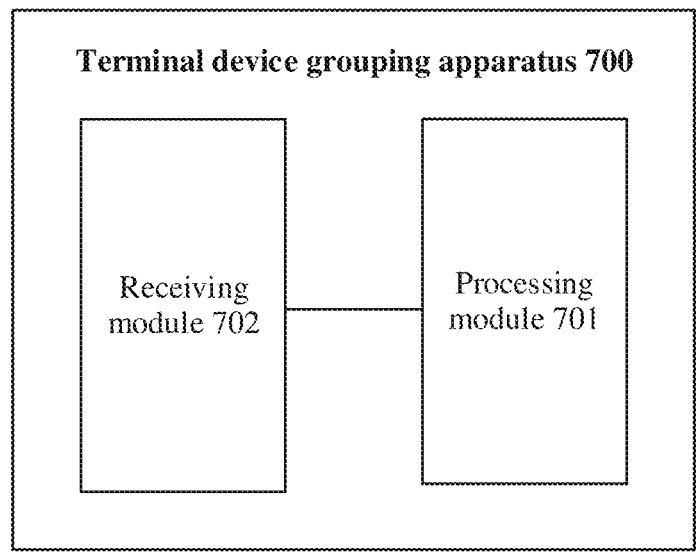
FIG. 7 is a functional block diagram of another terminal device grouping apparatus according to this application.

FIG. 7 is a schematic diagram of a terminal device grouping apparatus according to this application. As shown in FIG. 7, a terminal device grouping apparatus 700 may include a processing module 701 and a receiving module 702.

The receiving module 702 is configured to receive a grouping rule used to group, one or more times, terminal devices associated with a first paging occasion PO and power saving signal receiving location information of each group of terminal devices that are notified by a network device, where a power saving signal includes a wake-up signal WUS or a go-to-sleep signal GTS.

The processing module 701 is configured to: determine, according to the grouping rule received by the receiving module, a group number of a group to which a first terminal device belongs, and determine, based on a correspondence between the group number and the power saving signal receiving location information of each group of terminal devices, a power saving signal receiving location corresponding to the group number of the apparatus.

In an embodiment, when the receiving module 702 receives the grouping rule used to perform a plurality of times of grouping and the power saving signal receiving location of each group of terminal devices that are notified by the network device, mapping relationships included in the grouping rule used for each time of grouping are different.

The grouping rule includes: a mapping relationship between a group number and a discontinuous reception DRX cycle; or a mapping relationship between a group number and one or more of the following parameters: a terminal device identifier, a quantity of groups, a quantity N of paging frames PFs in each DRX cycle, a quantity Ns of POs in each PF, and a weight of each group of terminal devices; or a mapping relationship between a group number and a paging frequency range; or a mapping relationship between a group number and a terminal device category set; or a mapping relationship between a group number and a channel condition range.

In an embodiment, when the grouping rule includes the mapping relationship between a group number and a discontinuous reception DRX cycle, each group of terminal devices corresponds to a DRX cycle value or a DRX cycle value set. The processing module 701 is specifically configured to determine the group number of the apparatus 700 based on a DRX cycle of the apparatus 700 and the mapping relationship between a group number and a DRX cycle.

In an embodiment, when the grouping rule includes the mapping relationship between a group number and one or more of the following parameters: a terminal device identifier, a quantity of groups, a quantity of paging frames PFs in each DRX cycle, a quantity of POs in each PF, and a weight of each group of terminal devices, the group number is a minimum index value n that meets the following formula:

$$\mathrm{floor}(\mathrm{UE\_ID}/(N*Ns))\bmod g < g(0)+g(1)+\ldots+g(n)$$

UE_ID is the terminal device identifier, g(n) is a weight of a user group whose group number is n, g(n) is an integer, and $g(0)+g(1)+\ldots+g(G-1)=g$, where G is a quantity of groups of at least one terminal device group, a value range of the minimum index n is $0 \le n \le G-1$, N is the quantity of paging frames PFs in each DRX cycle, and Ns is the quantity of POs in each PF.

In an embodiment, when the grouping rule includes the mapping relationship between a group number and a paging frequency range, a quantity of groups for each time of grouping is the same as a quantity of paging frequency ranges. The processing module 701 is specifically configured to determine the group number of the apparatus 700 based on a paging frequency of the apparatus 700 and the mapping relationship between a group number and a paging frequency range. A paging frequency is an average quantity of times that a terminal device is paged in a unit time in a statistics time period determined according to a paging frequency statistics rule. The receiving module 702 is further configured to receive the paging frequency statistics rule notified by the network device, where the paging frequency statistics rule is used to determine a paging frequency statistics time period.

In an embodiment, when the grouping rule includes the mapping relationship between a group number and a terminal device category set, a quantity of groups for each time of grouping is the same as a quantity of terminal device category sets. The processing module 701 is specifically configured to determine the group number of the apparatus 700 based on a terminal device category of the apparatus 700 and the mapping relationship between a group number and a terminal device category set. The processing module 701 is further configured to determine a terminal device category of the apparatus 700 by using a terminal device feature of the apparatus 701, where the terminal device feature includes at least one of the following: a peak rate, a buffer size, and mobility.

In an embodiment, when the grouping rule includes the mapping relationship between a group number and a channel condition range, a quantity of groups for each time of grouping is the same as a quantity of channel condition ranges. The processing module 701 is specifically configured to determine the group number of the apparatus 700 based on a channel condition of the apparatus 700 and the mapping relationship between a group number and a channel condition range.

In an embodiment, the receiving module 702 is specifically configured to receive, by using system information, the grouping rule used to group, one or more times, the terminal devices associated with the first paging occasion PO and the power saving signal receiving location information of each group of terminal devices that are notified by the network device.

In an embodiment, an entity apparatus corresponding to the processing module 701 is a processor, and an entity apparatus corresponding to the receiving module 702 is a receiver. For specific embodiments of function units included in the terminal device grouping apparatus 700, refer to the foregoing embodiments. Details are not described herein again.

Figure 8:
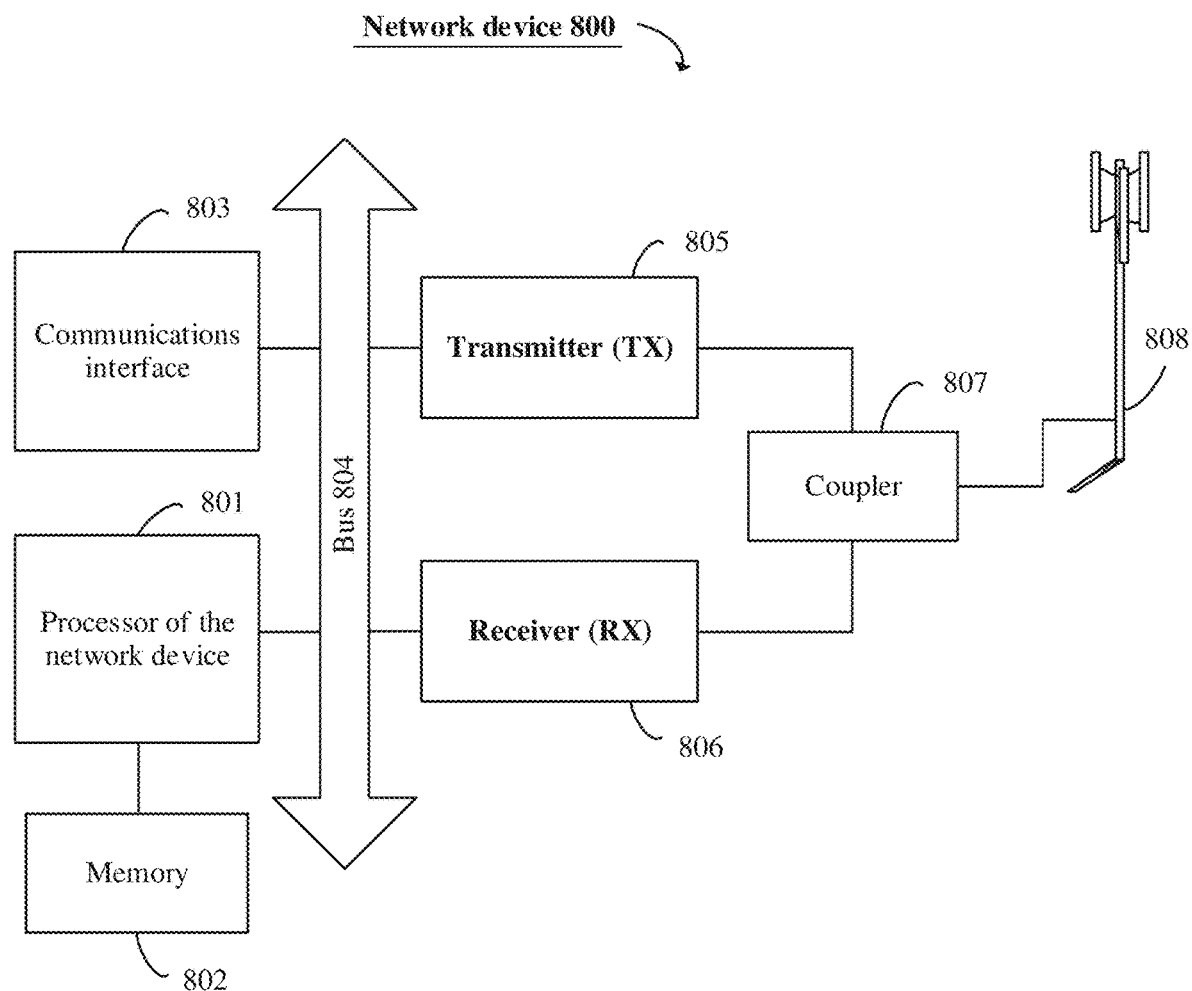
FIG. 8 is a schematic structural diagram of a terminal device grouping apparatus according to this application.

Referring to FIG. 8, FIG. 8 shows a network device 800 according to some embodiments of this application. As shown in FIG. 8, the network device 800 may include one or more network device processors 801, a memory 802, a transmitter 805, a receiver 806, a coupler 807, and an antenna 808. These components may be connected by using a bus 804 or in another manner. An example in which the components are connected by using a bus is used in FIG. 8.

The communications interface 803 may be used for communication between the network device 800 and another communication device, for example, a terminal device or another network device. Specifically, the terminal device may be the terminal 900 shown in FIG. 9.

The transmitter 805 may be configured to perform transmitting processing, for example, signal modulation, on a signal output by the network device processor 801. The receiver 806 may be configured to perform receiving processing, for example, signal demodulation, on a mobile communication signal received by the antenna 808. In some embodiments of this application, the transmitter 805 and the receiver 806 may be considered as a wireless modem. In the terminal device grouping apparatus 800, there may be one or more transmitters 805 and receivers 806. The antenna 808 may be configured to: convert electromagnetic energy in a transmission line into an electromagnetic wave in free space, or convert an electromagnetic wave in free space into electromagnetic energy in a transmission line. The coupler 807 may be configured to: divide a mobile communication signal into a plurality of channels of signals, and allocate the plurality of channels of signals to a plurality of receivers 806.

The memory 802 is coupled to the network device processor 801, and is configured to store various software programs and/or a plurality of groups of instructions. Specifically, the memory 802 may include a high-speed random access memory, and may further include a non-volatile memory, for example, one or more disk storage devices, a flash memory device, or another non-volatile solid-state storage device. The memory 802 may store an operating system (which is referred to as a system), for example, an embedded operating system such as uCOS, VxWorks, and RTLinux. The memory 802 may further store a network communications program. The network communications program may be used for communication with one or more additional devices, one or more terminal devices, and one or more network devices.

The network device processor 801 may be configured to manage a radio channel, establish and disconnect a call and a communication link, and provide cell handover control for a user in a local control area. Specifically, the network device processor 801 may include an administration/communication module (AM/CM) (a center for speech channel switching and information exchange), a basic module (BM) (configured to implement call processing, signaling processing, radio resource management, radio link management, and circuit maintenance functions), a transcoder and sub-multiplexer (TCSM) (configured to implement multiplexing/demultiplexing and transcoding functions), and the like.

In an embodiment, the network device processor 801 may be configured to read and execute a computer-readable instruction. Specifically, the network device processor 801 may be configured to invoke a program stored in the memory 802, for example, a program for implementing, on a side of the network device 800, the terminal device grouping method provided in one or more embodiments of this application, and execute an instruction included in the program.

It may be understood that the network device 800 may be the base station 101 in the wireless communications system 100 shown in FIG. 1, and may be implemented as a base transceiver station, a wireless transceiver, a basic service set (BSS), an extended service set (ESS), a NodeB, an eNodeB, an access point, a TRP, or the like.

It should be noted that the network device 800 shown in FIG. 8 is merely an embodiment of this application, and the network device 800 may further include more or fewer components. This is not limited herein.

Figure 9:
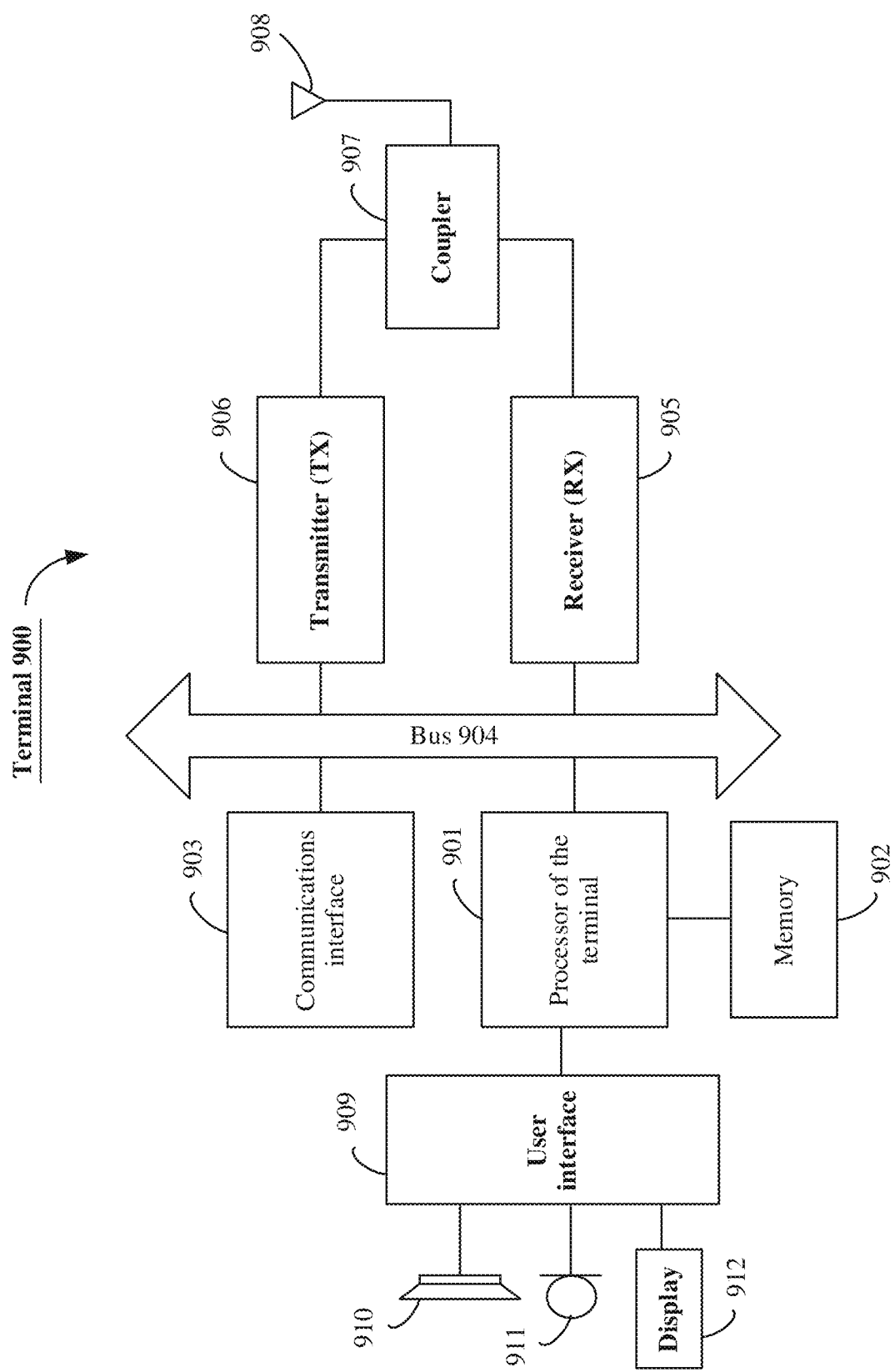
FIG. 9 is a schematic structural diagram of a terminal device according to this application.

Referring to FIG. 9, FIG. 9 shows a terminal 900 according to some embodiments of this application. As shown in FIG. 2, the terminal 900 may include one or more terminal processors 901, a memory 902, a receiver 905, a transmitter 906, a coupler 907, and an antenna 908. These components may be connected by using a bus 904 or in another manner. An example in which the components are connected by using a bus is used in FIG. 9.

The communications interface 903 may be used for communication between the terminal 900 and another communications device, for example, a network device. Specifically, the network device may be the terminal device grouping apparatus 600 shown in FIG. 6 or the network device 800 shown in FIG. 8.

The transmitter 906 may be configured to perform transmitting processing, for example, signal modulation, on a signal output by the terminal processor 901. The receiver 905 may be configured to perform receiving processing, for example, signal demodulation, on a mobile communication signal received by the antenna 908. In some embodiments of this application, the transmitter 906 and the receiver 905 may be considered as a wireless modem. In the terminal 900, there may be one or more transmitters 906 and receivers 905. The antenna 908 may be configured to: convert electromagnetic energy in a transmission line into an electromagnetic wave in free space, or convert an electromagnetic wave in free space into electromagnetic energy in a transmission line. The coupler 907 is configured to: divide a mobile communication signal received by the antenna 908 into a plurality of channels of signals, and allocate the plurality of channels of signals to a plurality of receivers 905.

In addition to the transmitter 906 and the receiver 905 shown in FIG. 9, the terminal 900 may further include other communications components, for example, a GPS module, a Bluetooth module, and a wireless fidelity (Wi-Fi) module. The terminal 900 may further support another wireless communication signal, for example, a satellite signal or a short wave signal, not limited to the foregoing described wireless communication signal. The terminal 900 may be further configured with a wired network interface (for example, a LAN interface) to support wired communication, not limited to wireless communication.

The memory 902 is coupled to the terminal processor 901, and is configured to store various software programs and/or a plurality of groups of instructions. Specifically, the memory 802 may include a high-speed random access memory, and may further include a non-volatile memory, for example, one or more disk storage devices, a flash memory device, or another non-volatile solid-state storage device. The memory 902 may store an operating system (which is referred to as a system), for example, an embedded operating system such as ANDROID, IOS, WINDOWS, or LINUX. The memory 902 may further store a network communication program. The network communication program may be used for communication with one or more additional devices, one or more terminal devices, and one or more network devices. The memory 902 may further store a user interface program. The user interface program may visually display content of an application program by using a graphical operation interface, and receive a control operation performed by the user on the application program by using an input control such as a menu, a dialog box, and a button.

In an embodiment, the memory 902 may be configured to store a program for implementing, on a side of the terminal 900, the terminal device grouping method provided in one or more embodiments of this application. For implementation of the terminal device grouping method provided in the one or more embodiments of this application, refer to subsequent embodiments.

The terminal processor 901 may be configured to read and execute a computer-readable instruction. Specifically, the terminal processor 801 may be configured to invoke a program stored in the memory 912, for example, the program for implementing, on the side of the terminal 900, the terminal device grouping method provided in one or more embodiments of this application, and execute an instruction included in the program.

It may be understood that the terminal 900 may be the terminal 103 in the wireless communications system 100 shown in FIG. 1, and may be implemented as a mobile device, a mobile station, a mobile unit, a wireless unit, a remote unit, a user agent, a mobile client, or the like.

It should be noted that the terminal 900 shown in FIG. 9 is only an embodiment of this application, and the terminal 900 may further include more or fewer components. This is not limited herein.

A person of ordinary skill in the art may understand that all or some of the processes of the methods in the embodiments may be implemented by a computer program instructing relevant hardware. The program may be stored in a computer readable storage medium. When the program is run, the processes of the methods in the embodiments are performed. The foregoing storage medium includes: any medium that can store program code, such as a ROM, a random access memory RAM, a magnetic disk, or an optical disc.

What is claimed is:

1. A terminal device grouping method, comprising:
   grouping, by a network device according to a grouping rule, terminal devices associated with a first paging occasion (PO) one or more times; and
   notifying, by the network device, all terminal devices associated with the first PO of the grouping rule,
   wherein the grouping rule comprises:
   a mapping relationship between a group number and a discontinuous reception (DRX) cycle;
   a mapping relationship between a group number and one or more of the following parameters:
   a terminal device identifier, a quantity of groups, a quantity of paging frames (PFs) in each discontinuous reception DRX cycle, a quantity of POs in each PF, and a weight of each group of terminal devices;
   a mapping relationship between a group number and a paging frequency range;
   a mapping relationship between a group number and a terminal device category set; or
   a mapping relationship between a group number and a channel condition range.

2. The method according to claim 1, wherein when the grouping rule comprises the mapping relationship between the group number and the one or more of the following parameters: the terminal device identifier, the quantity of groups, the quantity of paging frames PFs in each DRX cycle, the quantity of POs in each PF, and the weight of each group of terminal devices, the group number is a minimum index value n that meets the following formula:

$$\text{floor}(UE\_ID/(N*Ns)) \bmod g < g(0)+g(1)+ \ldots +g(n),$$

wherein

UE_ID is the terminal device identifier, g(n) is a weight of a user group whose group number is n, g(n) is an integer, and $g(0)+g(1)+ \ldots +g(G-1)=g$, wherein G is the quantity of groups, a value range of the minimum index value n is $0 \leq n \leq G-1$, N is the quantity of paging frames PFs in each DRX cycle, and Ns is the quantity of POs in each PF.

3. The method according to claim 1, wherein when the grouping rule comprises the mapping relationship between the group number and the paging frequency range, the method further comprises:
   obtaining, by the network device, a quantity of groups, and delimiting a plurality of paging frequency ranges based on the quantity of groups; or
   delimiting, by the network device, paging frequency ranges, wherein a quantity of groups is the same as a quantity of the paging frequency ranges.

4. The method according to claim 3, wherein a paging frequency is an average quantity of times that a terminal device is paged in a unit time in a statistics time period determined according to a paging frequency statistics rule; and the method further comprises:
   notifying, by the network device, all the terminal devices associated with the first PO of the paging frequency statistics rule, wherein the paging frequency statistics rule is used to determine a paging frequency statistics time period.

5. The method according to claim 1, wherein, when the grouping rule comprises the mapping relationship between the group number and the channel condition range, the method further comprises:
   obtaining, by the network device, a quantity of groups, and delimiting a plurality of channel condition ranges based on the quantity of groups; or
   delimiting, by the network device, channel condition ranges, wherein a quantity of groups is the same as a quantity of the channel condition ranges.

6. The method according to claim 1, wherein notifying, by the network device, all terminal devices associated with the first PO of the grouping rule comprises:
   notifying, by the network device, all terminal devices associated with the first PO of the grouping rule and power saving signal receiving location information of each group of terminal devices; wherein the power saving signal comprises a wake-up signal WUS or a sleep signal GTS.

7. A terminal device grouping method, comprising:
   receiving, by a first terminal device, a grouping rule used to group terminal devices associated with a first paging occasion (PO) one or more times that are notified by a network device; and
   determining, by the first terminal device according to the grouping rule, a group number of a group to which the first terminal device belongs,
   wherein the grouping rule comprises:
   a mapping relationship between a group number and a discontinuous reception (DRX) cycle;
   a mapping relationship between a group number and one or more of the following parameters:

a terminal device identifier, a quantity of groups, a quantity of paging frames (PFs) in each DRX cycle, a quantity of POs in each PF, and a weight of each group of terminal devices;
a mapping relationship between a group number and a paging frequency range;
a mapping relationship between a group number and a terminal device category set; or
a mapping relationship between a group number and a channel condition range.

8. The method according to claim 7, wherein when the grouping rule comprises the mapping relationship between the group number and the one or more of the following parameters: the terminal device identifier, the quantity of groups, the quantity of paging frames PFs in each DRX cycle, the quantity of POs in each PF, and the weight of each group of terminal devices, the group number is a minimum index value n that meets the following formula:

$$\text{floor}(UE\_ID/(N*Ns)) \bmod g < g(0)+g(1)+\ldots+g(n),$$
wherein

UE_ID is the terminal device identifier, $g(n)$ is a weight of a user group whose group number is n, $g(n)$ is an integer, and $g(0)+g(1)+\ldots+g(G-1)=g$, wherein G is a quantity of groups of at least one terminal device group, a value range of the minimum index value n is $0 \leq n \leq G-1$, N is the quantity of paging frames PFs in each DRX cycle, and Ns is the quantity of POs in each PF.

9. The method according to claim 7, wherein when the grouping rule comprises the mapping relationship between the group number and the paging frequency range, a quantity of groups is the same as a quantity of paging frequency ranges; and the determining, by the first terminal device according to the grouping rule, the group number of the group to which the first terminal device belongs comprises:
determining, by the first terminal device, the group number of the first terminal device based on a paging frequency of the first terminal device and the mapping relationship between the group number and the paging frequency range.

10. The method according to claim 9, wherein the paging frequency is an average quantity of times that a terminal device is paged in a unit time in a statistics time period determined according to a paging frequency statistics rule; and the method further comprises:
receiving, by the first terminal device, the paging frequency statistics rule notified by the network device, wherein the paging frequency statistics rule is used to determine a paging frequency statistics time period.

11. The method according to claim 7, wherein receiving, by a first terminal device, a grouping rule used to group terminal devices associated with a first paging occasion (PO) one or more times that are notified by a network device comprises:
receiving, by a first terminal device, a grouping rule used to group terminal devices associated with a first paging occasion (PO) one or more times and power saving signal receiving location information of each group terminal devices that are notified by a network device, wherein the power saving signal comprises a wake-up signal (WUS) or a sleep signal (GTS); and
the method further comprises:
determining, by the first terminal device based on a correspondence between the group number and the power saving signal receiving location information of each group of terminal devices, a power saving signal receiving location corresponding to the first terminal device.

12. A communication apparatus, comprising:
a processor, configured to group, one or more times according to a grouping rule, terminal devices associated with a first paging occasion (PO); and
a transmitter, configured to notify all terminal devices associated with the first PO of the grouping rule obtained through one or more times of grouping by the processor,
wherein the grouping rule comprises:
a mapping relationship between a group number and a discontinuous reception (DRX) cycle;
a mapping relationship between a group number and one or more of the following parameters:
a terminal device identifier, a quantity of groups, a quantity of paging frames (PFs) in each discontinuous reception DRX cycle, a quantity of POs in each PF, and a weight of each group of terminal devices;
a mapping relationship between a group number and a paging frequency range;
a mapping relationship between a group number and a terminal device category set; or
a mapping relationship between a group number and a channel condition range.

13. The apparatus according to claim 12, wherein when the grouping rule comprises the mapping relationship between the group number and the one or more of the following parameters: the terminal device identifier, the quantity of groups, the quantity of paging frames PFs in each DRX cycle, the quantity of POs in each PF, and the weight of each group of terminal devices, the group number is a minimum index value n that meets the following formula:

$$\text{floor}(UE\_ID/(N*Ns)) \bmod g < g(0)+g(1)+\ldots+g(n),$$
wherein

UE_ID is the terminal device identifier, $g(n)$ is a weight of a user group whose group number is n, $g(n)$ is an integer, and $g(0)+g(1)+\ldots+g(G-1)=g$, wherein G is the quantity of groups, a value range of the minimum index value n is $0 \leq n \leq G-1$, N is the quantity of paging frames PFs in each DRX cycle, and Ns is the quantity of POs in each PF.

14. The apparatus according to claim 12, wherein the processor is further configured to:
when the grouping rule comprises the mapping relationship between the group number and the paging frequency range, obtain a quantity of groups, and delimit a plurality of paging frequency ranges based on the quantity of groups; or
when the grouping rule comprises the mapping relationship between the group number and the paging frequency range, delimit paging frequency ranges, wherein a quantity of groups is the same as a quantity of the paging frequency ranges.

15. The apparatus according to claim 14, wherein a paging frequency is an average quantity of times that a terminal device is paged in a unit time in a statistics time period determined according to a paging frequency statistics rule; and the transmitter is further configured to:
notify all the terminal devices associated with the first PO of the paging frequency statistics rule, wherein the paging frequency statistics rule is used to determine a paging frequency statistics time period.

16. The apparatus according to claim 12, wherein the processor is further configured to:

when the grouping rule comprises the mapping relationship between the group number and the channel condition range, obtain a quantity of groups, and delimit a plurality of channel condition ranges based on the quantity of groups; or when the grouping rule comprises the mapping relationship between the group number and the channel condition range, delimit channel condition ranges, wherein a quantity of groups is the same as a quantity of the channel condition ranges.

17. The apparatus according to claim 12, wherein the transmitter configured to notify all terminal devices associated with the first PO of the grouping rule and power saving signal receiving location information of each group of terminal devices; wherein the power saving signal comprises a wake-up signal WUS or a sleep signal GTS.

18. A communication apparatus, comprising:
a receiver, configured to receive a grouping rule used to group terminal devices associated with a first paging occasion (PO) one or more times that are notified by a network device; and
a processor, configured to: determine, according to the grouping rule received by the receiver, a group number of a group to which a first terminal device belongs, wherein the grouping rule comprises:
a mapping relationship between a group number and a discontinuous reception (DRX) cycle;
a mapping relationship between a group number and one or more of the following parameters:
a terminal device identifier, a quantity of groups, a quantity N of paging frames (PFs) in each DRX cycle, a quantity Ns of POs in each PF, and a weight of each group of terminal devices;
a mapping relationship between a group number and a paging frequency range;
a mapping relationship between a group number and a terminal device category set; or
a mapping relationship between a group number and a channel condition range.

19. The apparatus according to claim 18, wherein, when the grouping rule comprises the mapping relationship between the group number and the one or more of the following parameters: the terminal device identifier, the quantity of groups, the quantity of paging frames PFs in each DRX cycle, the quantity of POs in each PF, and the weight of each group of terminal devices, the group number is a minimum index value n that meets the following formula:

$$\text{floor}(UE\_ID/(N*Ns)) \bmod g < g(0)+g(1)+ \ldots +g(n),$$
wherein

UE_ID is the terminal device identifier, $g(n)$ is a weight of a user group whose group number is n, $g(n)$ is an integer, and $g(0)+g(1)+ \ldots +g(G-1)=g$, wherein G is a quantity of groups of at least one terminal device group, a value range of the minimum index value n is $0 \leq n \leq G-1$, N is the quantity of paging frames PFs in each DRX cycle, and Ns is the quantity of POs in each PF.

20. The apparatus according to claim 18, wherein when the grouping rule comprises the mapping relationship between the group number and the paging frequency range, a quantity of groups is the same as a quantity of paging frequency ranges; and the processor is configured to:
determine the group number of the apparatus based on a paging frequency of the apparatus and the mapping relationship between the group number and the paging frequency range.

21. The apparatus according to claim 20, wherein the paging frequency is an average quantity of times that a terminal device is paged in a unit time in a statistics time period determined according to a paging frequency statistics rule; and the receiver is further configured to:
receive the paging frequency statistics rule notified by the network device, wherein the paging frequency statistics rule is used to determine a paging frequency statistics time period.

22. The apparatus according to claim 18, wherein, when the grouping rule comprises the mapping relationship between the group number and the channel condition range, a quantity of groups is the same as a quantity of channel condition ranges; and
wherein the processor is further configured to:
determine the group number of the apparatus based on a channel condition of the apparatus and the mapping relationship between the group number and the channel condition range.

23. The apparatus according to claim 18, wherein the receiver is configured to receive a grouping rule used to group terminal devices associated with a first paging occasion (PO) one or more times and power saving signal receiving location information of each group terminal devices that are notified by a network device, wherein the power saving signal comprises a wake-up signal (WUS) or a sleep signal (GTS); and
the processor is further configured to determine a power saving signal receiving location corresponding to the apparatus based on a correspondence between the group number and the power saving signal receiving location information of each group of terminal devices.

* * * * *